US007645206B2

(12) United States Patent
Holmes et al.

(10) Patent No.: US 7,645,206 B2
(45) Date of Patent: Jan. 12, 2010

(54) THREE MODE ELECTRICALLY-VARIABLE TRANSMISSION

(75) Inventors: Alan G. Holmes, Clarkston, MI (US); Michael R. Schmidt, Carmel, IN (US); Donald Klemen, Carmel, IN (US); Brendan M. Conlon, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 507 days.

(21) Appl. No.: 11/678,635

(22) Filed: Feb. 26, 2007

(65) Prior Publication Data

US 2008/0207372 A1 Aug. 28, 2008

(51) Int. Cl.
*F16H 3/62* (2006.01)
*F16H 3/72* (2006.01)

(52) U.S. Cl. .......................................... 475/5; 475/286

(58) Field of Classification Search .................. 475/10, 475/151, 271
See application file for complete search history.

(56) References Cited

U.S. PATENT DOCUMENTS 6,551,208 B1 4/2003 Holmes et al.
2006/0025264 A1 * 2/2006 Sowul et al. .................. 475/5

* cited by examiner

*Primary Examiner*—Sherry L Estremsky
*Assistant Examiner*—Edwin A. Young

(57) ABSTRACT

An electrically-variable transmission is provided with first and second motor/generators and three planetary gear sets. The planetary gear sets have continuous interconnections, and selective connections via a plurality of torque-transmitting mechanisms, that provide three forward electrically-variable modes. Preferably, the planetary gear sets are characterized by effective gear ratios such that a substantially equal maximum torque is required from each of the motor/generators during the three forward electrically-variable modes for a given torque on the input member. This allows the first and second motor/generators to be substantially equal in size.

27 Claims, 9 Drawing Sheets

THREE MODE ELECTRICALLY-VARIABLE TRANSMISSION

TECHNICAL FIELD

The invention relates to an electrically-variable transmission with two motor/generators having three forward electrically-variable modes and preferably with a substantially equal maximum torque requirement on the two motor/generators for a given input torque.

BACKGROUND OF THE INVENTION

Electrically-variable transmissions typically have an input member connected to an engine and one or two motor/generators connected to different members of planetary gear sets to allow one or more electrically-variable modes of operation, fixed speed ratio modes, and an electric-only (battery powered) mode. Electrically-variable transmissions may improve vehicle fuel economy in a variety of ways. For instance, the engine may be turned off at idle, during periods of deceleration and braking, and during periods of low speed or light load operation to eliminate efficiency losses due to engine drag. Captured braking energy (via regenerative braking) or energy stored by one of the motors acting as a generator during periods when the engine is operating is utilized during these engine off periods. Transient demand for engine torque or power is supplemented by the motor/generators during operation in engine-on, electrically-variable modes, allowing for downsizing the engine without reducing apparent vehicle performance. Additionally, the engine may be operated at or near the optimal efficiency point for a given power demand. The motor/generators are able to capture vehicle kinetic energy during braking, which is used to keep the engine off longer, supplement engine torque or power and/or operate at a lower engine speed, or supplement accessory power supplies. Additionally, the motor/generators are very efficient in accessory power generation and electric power from the battery serves as an available torque reserve allowing operation at a relatively low transmission numerical speed ratio.

SUMMARY OF THE INVENTION

An electrically-variable transmission is provided with two electric motor/generators and a plurality of planetary gear sets. The transmission provides three forward electrically-variable modes by engagement of torque-transmitting mechanisms in different combinations. The maximum torque required of each motor/generator is preferably substantially equal for a given input torque over the three forward electrically-variable modes. This allows the first and second motor/generators to be substantially equal in size.

The first, second, and third planetary gear sets of the transmission may each be represented by a different lever in a lever diagram of the transmission. Each lever has a first, a second and a third node representing a respective different member of the planetary gear set represented by the lever. An input member, an output member and the first and second motor/generators are connected with different nodes. Torque-transmitting mechanisms are selectively engagable in different combinations to connect the nodes with one another or with a stationary member to establish three forward electrically-variable modes. Preferably, the nodes are interconnected in these modes such that the ratio of the distance between the node to which one of the motor/generators is connected and a given node to the distance between the node to which the input member is connected and the given node is the same in each electrically-variable mode. (The motor/generator considered in this ratio is that which requires the greater torque in that electrically-variable mode.) Therefore, for a given torque at the input member, the maximum torque required from one of the motor/generators during the three forward electrically-variable modes is substantially equal to the maximum torque required from the other motor/generator during the three forward electrically-variable modes.

Preferably, the torque ratio between the input member and one motor/generator during a first variable speed ratio mode is substantially equal to the torque ratio between the input member and the same motor/generator during a second variable speed ratio mode, and substantially equal to the torque ratio between the one motor/generator and the input member during a third variable speed mode. The maximum torque ratio between the input member and the first motor/generator throughout all of the variable speed ratio modes may thus be substantially equal to the maximum torque ratio between the input member and the second motor/generator throughout all of the variable speed ratio modes.

Preferably, the first electrically-variable mode is an input-split mode, and the second and third electrically-variable modes are compound-split modes. The compound-split modes are characterized by substantially identical ratio spreads.

In one embodiment, an interconnecting member is continuously connected with a member of the first planetary gear set. One of the members of the third planetary gear set is connected for common rotation with either the stationary member or one of the motor/generators in each of the three forward electrically-variable modes. Another one of the members of the third planetary gear set is connected for common rotation with the interconnecting member in each of the three forward electrically-variable modes. The member that is connected with either the stationary member or one of the motor/generators and the member connected for common rotation with the interconnecting member determine the effective gear ratio of the third planetary gear set.

In another embodiment, each of the first, second and third planetary gear sets is represented by a respective three-node lever having a first, second and third node representing the first, second and third members. The first and the third planetary gear sets are compound planetary gear sets. A first interconnecting member continuously connects the second node of the first lever for common rotation with the first node of the second lever. A second interconnecting member continuously connects the second node of the second lever for common rotation with the second node of the third lever. The input member is continuously connected for common rotation with the first node of the first planetary gear set. The first node of the third planetary gear set is continuously connected for common rotation with the output member. The first motor/generator is continuously connected with the third node of the first lever. The second motor/generator is continuously connected with the first node of the second lever. Preferably, a first torque-transmitting mechanism is selectively engagable to connect the third node of the third lever to the stationary member, a second torque-transmitting mechanism is selectively engagable to connect the third node of the third lever for common rotation with the first node of the second lever a third torque-transmitting mechanism is selectively engagable to connect the third node of the second lever with a stationary member, and a fourth torque-transmitting mechanism is selectively engagable to connect the third node of the first lever for common rotation with the third node of the second lever. With the torque-transmitting mechanisms connected in this manner, the first and third torque-transmitting mechanisms may be engaged to establish the first electrically-variable mode, the first and fourth torque-transmitting mechanisms may be engaged to establish the second electrically-variable mode, and the second and fourth torque-transmitting mechanisms may be engaged to establish the third electrically-variable mode.

The planetary gear sets used in the electrically-variable transmission are preferably characterized by effective gear ratios that require a substantially equal maximum torque from each of the motor/generators during the three forward electrically-variable modes for a given toque on the input member. In one embodiment, the effective gear ratios of two of the three of the planetary gear sets are not less than 1.7 and not greater than 2.3, and the effective gear ratio of the other planetary gear set is not less than 1.0 and not greater than 1.4. In another embodiment, the effective gear ratios of two of the three planetary gear sets are not less than 1.0 and not greater than 1.4, and the effective gear ratio of the other planetary gear set is not less than 1.7 and not greater than 2.3.

In embodiments in which the third planetary gear set is a compound planetary gear set, the third planetary gear set may include a first sun gear member, a carrier member rotatably supporting a first and a second set of pinion gears, and a second sun gear member. The first and second sets of pinion gears continuously mesh with one another, and the first sun gear member continuously meshes with the first set of pinion gears. The second sun gear member continuously meshes with the second set of pinion gears. By utilizing a compound planetary gear set such as this, an effective gear ratio for the set, between the smaller of the two sun gear members and the larger of the two sun gear members, as low as that of 1.0 is achievable, when both sun gear members are of the same size, while such an effective gear ratio between the sun gear member and the ring gear member is not possible for a simple planetary gear set using a sun gear member, a ring gear member and a single set of pinion gears all meshing in a single plane.

In an embodiment in which the third planetary gear set is a compound planetary gear set, alternatively, the third planetary gear set may include a sun gear member, a carrier member rotatably supporting a first and second set of pinion gears, and a ring gear member. The first and second sets of pinion gears continuously mesh with one another, and the sun gear member continuously meshes with the first set of pinion gears. The second set of pinion gears continuously meshes with the ring gear member. By utilizing compound planetary gear sets such as these, an effective gear ratio for the set, between the sun gear member and the carrier member, close to that of 1.0 is achievable for the third planetary gear set, while a simple planetary gear set with such an effective gear ratio, between the sun gear member and the ring gear member, would require impractically small pinion gears.

In one embodiment of the electrically-variable transmission, the plurality of planetary gear sets includes at least two pairs of members continuously connected for common rotation. Each of the pairs includes members of two of the planetary gear sets. At least one of the planetary gear sets includes a first gear member, a second gear member, and a carrier member that rotatably supports a first and a second set of pinion gears. The first set of pinion gears meshes with the first gear member, and the second set of pinion gears meshes with the first set of pinion gears and with the second gear member. The torque-transmitting mechanisms are selectively engagable in at least two combinations of three to thereby affect two different fixed speed ratios between the input member and the output member. Additionally, the torque-transmitting mechanisms are selectively engagable in at least three combinations of two to thereby effect, in conjunction with the electric motor/generators, variable speed ratio modes between the input member and the output member.

A method of designing a transmission having three planetary gear sets and two motor/generators includes selecting continuous connections between the motor/generators and selective ones of the planetary gear sets, as well as selective connections, via engagement of the torque-transmitting mechanisms, between different members of the planetary gear sets or between a member of one of the planetary gear sets and a stationary member to thereby enable three forward electrically-variable modes of operation by engagement of different combinations of the torque-transmitting mechanisms. The method further includes selecting effective gear ratios of the three planetary gear set that require a substantially equal maximum torque for each motor/generator for a given input torque during the three forward electrically-variable modes, thereby allowing the first and second motor/generators to be substantially equal in size.

In an electrically-variable transmission, one motor/generator typically absorbs the power generated by the other to vary the ratio of the transmission, so their power requirements are identical, except for losses and battery and accessory power. If the transmission has more than one electrically-variable mode of operation, then the motor/generators typically take turns using or supplying battery power, and their power requirements are substantially identical for hybrid operation as well as for transmitting engine power. Therefore, providing equal torque requirements which match the already equal power requirements minimizes the size and cost of the two motor/generators for such a transmission. That is, with equal torque requirements for both motor/generators, neither of the two motor/generators of equal power is required to be larger for the sole reason of developing greater torque.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

First Lever Diagram Embodiment

Figure 1:
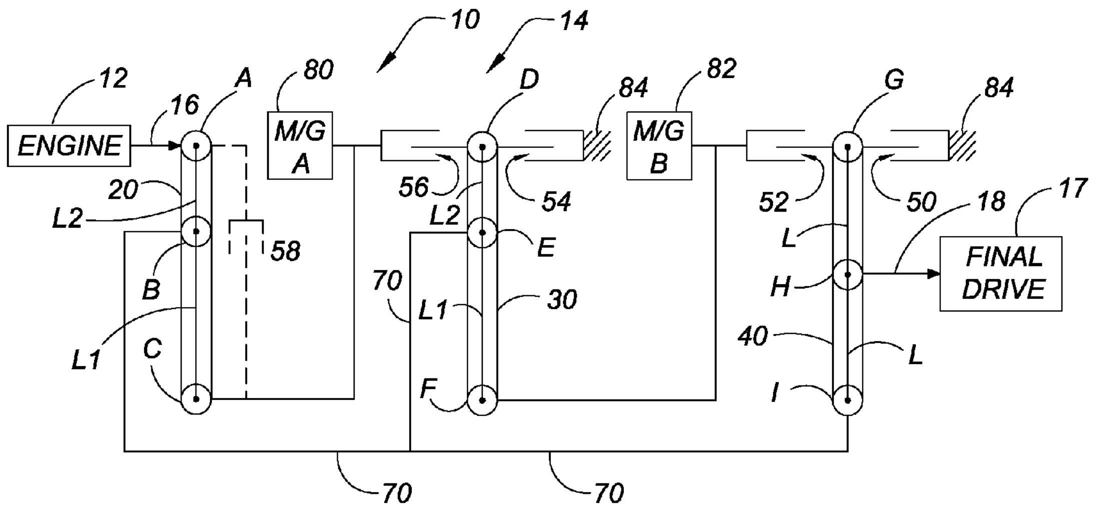
FIG. 1 is a schematic illustration of a first embodiment of an electrically-variable transmission depicted in lever diagram form.

Referring to the drawings, wherein like reference numbers refer to like components, FIG. 1 illustrates a powertrain 10 including an engine 12 connected to an electrically-variable transmission 14. The transmission 14 is designed to receive at least a portion of its driving power from the engine 12 in some of its operating modes, as discussed below. The engine has an output shaft that serves as an input member 16 of the transmission 14. A final drive unit 17 is operatively connected to an output member 18 of the transmission 14.

The transmission 14 includes a three-node lever 20 representing a first planetary gear set having a first, a second and a third member, represented by nodes A, B and C, respectively. The members may be a ring gear member, a sun gear member and a carrier member, although not necessarily in that order. As used herein, a "node" is a component of a transmission, such as a ring gear member, a carrier member, or a sun gear member, which is characterized by a rotational speed and which can act as a junction of torques applied to that component from other components and by that component to other components. The other components which may interact with a given node include other coaxial members of the same set of planetary gears which appear as other nodes on the same lever. The other components which may interact with a given node also include interconnections to members of other planetary gear sets which appear as nodes on another lever, a stationary member such as the transmission case, and other transmission members.

The transmission 14 further includes another three-node lever 30 representing a second planetary gear set having a first, a second and a third member, represented by nodes D, E, F, respectively. The nodes D, E, and F each represent a ring gear member, a sun gear member, and a carrier member, although not necessarily in that order. The transmission 14 also includes another three-node lever 40 representing a third planetary gear set having first, second, and third nodes G, H and I, respectively. The nodes G, H, and I each represent a ring gear member, a sun gear member, and a carrier member, although not necessarily in that order.

The transmission 14 has several fixed interconnections. An interconnecting member 70 continuously interconnects nodes B, E and I for common rotation. The interconnecting member 70 may be a single shaft, such as a main shaft running axially in the transmission 14. Alternatively, separate interconnecting members may be used, for example to connect nodes B and E, and nodes E and I, respectively. A motor/generator 80 (also referred to as M/G A) is continuously connected with node C. The input member 16 is connected for common rotation with node A. Another motor/generator 82 (also referred to as M/G B) is connected or common rotation with node F. Node H is connected for common rotation with the output member 18. As will be understood by those skilled in the art, the motor/generators 80, 82 each have a rotor that is rotatable and a stator that is continuously grounded to a stationary member, such as a casing of the transmission 14. As is discussed further below, the transmission 14 is configured such the motor/generators 80 and 82 are subjected to a substantially equal maximum torque requirement that is required of each respective motor/generator at some point during three forward electrically-variable modes. This allows the motor/generators to have a substantially equal, minimal size.

The transmission 10 also has several selectively engagable torque-transmitting mechanisms that provide various operating modes, as described below. Torque-transmitting mechanism 50, a stationary clutch, also referred to as a brake, is selectively engagable to ground node G with a stationary member 84, such as a casing of the transmission 14. Torque-transmitting mechanism 52, a rotating clutch, is selectively engagable to connect node F and motor/generator 82 for common rotation with node G. Another torque-transmitting mechanism 54, a stationary clutch, is selectively engagable to ground node D to the stationary member 84. Finally, torque-transmitting mechanism 56, a rotating clutch, is selectively engagable to connect node C and motor/generator 80 for common rotation with node D.

An additional, optional torque-transmitting mechanism 58 (shown in phantom in FIG. 1 to denote that it is optional) may be included to provide additional operating modes, as described below. Torque-transmitting mechanism 58, a rotating clutch, is selectively engagable to connect node A for common rotation with node C. By connecting the two members of the planetary gear set represented by the nodes A and C of lever 20, engagement of torque-transmitting mechanism 58 causes all members of the planetary gear set represented by lever 20 to rotate at the same speed, thus functioning as a lock-up clutch.

If the torque-transmitting mechanism 50 is engaged, node G is a reaction member within the planetary gear set represented by lever 40, and power transferred via the interconnecting member 70 will be transmitted through node I to node H and therefore to the output member 18. When the torque-transmitting mechanism 52 is engaged, the motor/generator 82 receives power from or delivers power to node G as well as node F. When the torque-transmitting mechanism 54 is engaged, node D is held stationary and becomes a reaction member within the planetary gear set represented by lever 30. When the torque-transmitting mechanism 56 is engaged, the motor/generator 80 is connected for rotation with node D, and either receives or accepts power through node D as well as node C. When torque-transmitting transmitting mechanism 58 is engaged, the planetary gear set represented by lever 20 is locked-up, such that the speed of the input member is supplied to node E.

Each embodiment of a powertrain and transmission discussed herein has an electric power source that is operatively connected to the motor/generators such that the motor/generators may transfer power to or receive power from the power source. A controller is operatively connected to the electric power source to control the distribution of power from or to the power source. An electric power source may be one or more batteries. Other electric power sources, such as fuel cells, have the ability to provide, or store and dispense, electric power and may be used in place of batteries. An electric power source and controller is shown and described with respect to each of the embodiments of FIGS. 5-9 and 14, which are shown in stick-diagram form. The embodiments of FIGS. 1-4 and 10-13, which are shown in lever diagram form, also incorporate an electric power source and controller, although not shown, which are operatively connected to the motor/generators in like manner as shown in FIGS. 5-9 and 14. Operating data gathered by sensors, such as the speed of the input member 16 and of the output member 18, may be provided to the controller as well, for various uses, such as when operating in a regenerative braking mode.

Figure 2:
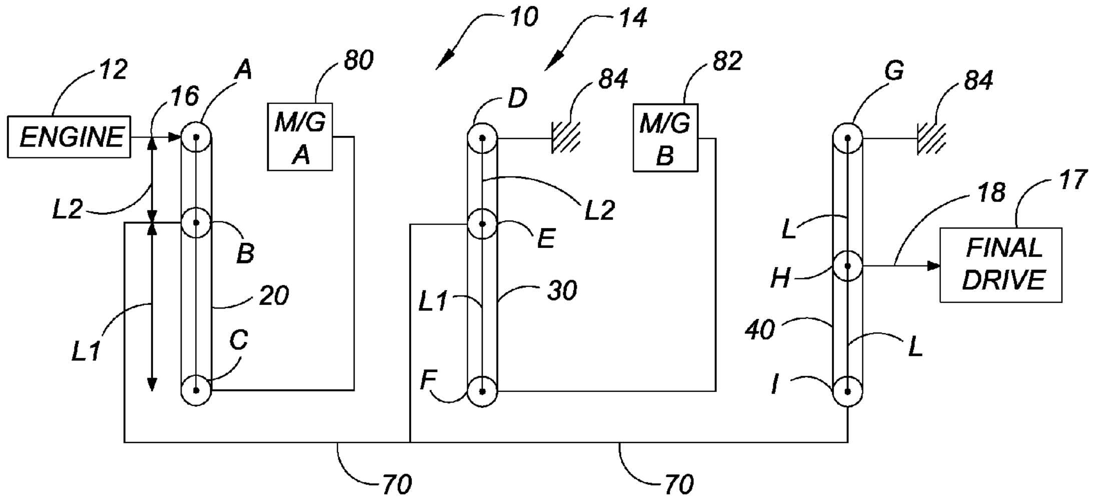
FIG. 2 is a schematic illustration of the embodiment of FIG. 1 in a first forward electrically-variable mode.

The transmission 14 achieves several operating modes, including three forward electrically-variable modes, each illustrated in FIGS. 2-4, respectively, as further detailed below. The transmission embodiments of FIGS. 5-9 are various alternative implementations of the lever diagram transmission 14, and operate in like manner as the transmission 14. Engagement of the torque-transmitting mechanisms 50, 52, 54 and 56 in combinations of two establishes the three forward electrically-variable modes of operation. The engagement of torque-transmitting mechanisms 50 and 54 establishes a first forward electrically-variable mode. The engagement of torque-transmitting mechanisms 50 and 56 establishes a second forward electrically-variable mode. The engagement of torque-transmitting mechanisms 52 and 56 establishes a third forward electrically-variable mode. Engagement of the torque-transmitting mechanisms 50, 52, 54 and 56 in combinations of three establishes various fixed ratio operating modes. Engagement of torque-transmitting mechanism 58 in addition to each set of two torque-transmitting mechanisms that establish the respective electrically-variable modes permits a fixed ratio mode for those electrically-variable modes wherein the connected motor/generator 80 turns in the forward direction relative to the engine 12. The transmission 14 is capable of driving the output member 18 without action of the engine 12, that is while input member 16 is stationary, in any of the electrically-variable modes but would preferably operate in the first forward electrically-variable mode. The transmission 14 is also capable of driving the output member 18 in reverse in any of the electrically-variable modes but would preferably operate in the first forward electrically-variable mode for reverse operation as well, simply by choosing a combination of speeds of the motor/generators 80 and 82 to cause reverse rotation of the output member 18.

Those skilled in the art of transmission design will recognize that the dimensions of the segments of a lever (i.e., the relative spacing between nodes) are proportionate to, and representative of, the number of gear teeth on, or the working radii of, the gear members that determine the effective gear ratio of the planetary gear set represented by the lever. As used herein, an "effective gear ratio", in the case of a simple planetary gear set, is:

$N_R/N_S$, the ratio of the number of teeth of the ring gear member $N_R$ to the number of teeth of the sun gear member $N_S$.

For a simple planetary gear set, this ratio is generally known simply as the "gear ratio", but a broader term must be included herein to define the relative sizes of the members of a planetary gear set to include compound planetary gear sets. In the case of a compound planetary gear set, the effective gear ratio depends upon the ratio of the component that acts as a ring gear member would in a simple planetary gear set to the component that acts as a sun gear member would in a simple planetary gear set.

For example, in a compound planetary gear set having a sun gear member, a carrier member rotatably supporting two sets of pinion gears and a ring gear member, with a first set of the pinion gears meshing with the sun gear member and with a second set of the pinion gears, and with the second set of pinion gears also intermeshing with the ring gear member, the effective gear ratio is:

$N_R/N_S-1$, the ratio of the number of teeth of the ring gear member $N_R$ to the number of teeth of the sun gear member $N_S$, less one.

In a compound planetary gear set having a first sun gear member, a first set of pinion gear that meshes with the first sun gear member and with a second set of pinion gears, and a second sun gear member meshing with the second set of pinion gears, the effective gear ratio is:

$Ns_L/Ns_S$, the ratio of the number of teeth of the larger sun gear member ($Ns_L$) to the number of teeth of the smaller sun gear member ($Ns_S$).

Referring to the transmission 14 of FIG. 1, the distance between nodes A and B is L2 while the distance between nodes B and C is L1. The distance L1 is chosen to be substantially equal to twice the distance L2, creating an effective gear ratio of lever 20 of 2.0. The distance between nodes E and F is equivalent to that between nodes B and C, or L1. The distance between nodes D and E is equivalent to that between nodes A and B, or L2. Thus, the effective gear ratio of lever 30 is 2.0. The distance between nodes H and I and the distance between nodes G and H are both L. Thus, the effective gear ratio of lever 40 is as close as is practical to 1.0. Although it is impossible to build a simple planetary gear set with an effective gear ratio of 1.0 (because the dimension of the ring gear member would have to be the same as the dimensions of the sun gear member), and becomes impractical to approach the effective gear ratio of 1.0 for a simple planetary gear set as extremely small and fast rotating pinion gears would be required, by use of a compound planetary gear set, an effective gear ratio of 1.0, which is, by the definition herein, the lowest possible ratio for any planetary gear set, can be attained.

The leverage that a node has about another node is proportionate to the distance to the other node; thus, node C has twice the leverage about node B as does node A; node F has twice the leverage about node E as does node D, and nodes I and G have the same leverage about node H. Additionally, the torque relationship between members of a planetary gear set may be represented and replaced by proportionate horizontal forces acting on the respective nodes. Because the torques acting on a planetary gear set must balance, the forces acting on the lever must likewise be balanced. The relative placement of nodes on a lever are points of application of forces analogous to ring gear member, sun gear member and carrier member torques.

The first forward electrically-variable mode is an input-split mode of operation, while the second and third modes are compound-split modes of operation. In general, an input-split mode uses gearing to split the power flow through the transmission from input member to output member by speed in closest association with the input member, while a compound-split mode uses gearing to split the power flow through the transmission by speed in essentially equal association with both input member and output member. That is, in an input-split mode, the speed of the input member is not directly proportional to the speeds of either of the motor/generators but the speed of the output member is directly proportional to the speed of a motor/generator, while in a compound-split mode neither the speed of the input member nor the speed of the output member is directly proportional to the speeds of either of the motor/generators. There are, of course, other combinations of engagements of the torque-transmitting mechanisms that will permit other operating conditions. For example, with the torque-transmitting mechanisms 54 and 56 engaged simultaneously, the motor/generator 82 can be utilized as a motor to supply power to the interconnecting member 70 and thereby provide starting torque for the engine 12. If all four of the torque-transmitting mechanisms 50, 52, 54 and 56 are engaged simultaneously, the input shaft 16 and the output shaft 18 are effectively grounded and therefore no power can be transmitted, thus producing a "park gear" arrangement. The simultaneous disengagement of all of the torque-transmitting mechanisms provides a positive neutral condition.

For purposes of the following discussion, the rotational direction of the engine 12 will be considered forward or positive, and the rotational direction opposite that of the engine 12 will be considered reverse or negative. During the first mode of operation, the torque-transmitting mechanisms 50 and 54 are engaged. In a neutral condition, the engine 12 is at an idle speed, and the speed of the motor/generator 80 is negative or reverse, such that the speed of the node B is zero. When the powertrain 10 is being operated in the neutral condition, it can move a vehicle in either a forward direction or a reverse direction. For movement in the reverse direction, the negative or reverse speed of the motor/generator 80 is permitted to increase, thereby increasing the speed of node B in the negative direction. The motor/generator 82 is operated as a motor to assist in driving the vehicle and therefore adding power to the transmission 14 at the node F, which is distributed to the interconnecting member by the node E. This power is transmitted to node I and then through node H to the output member 18. As is noted, the vehicle can be moved in the reverse direction from the neutral condition. Also, during the reverse operation, the speed of the engine 12 is increased from the idle speed to an elevated speed.

First Forward Electrically-Variable Mode of Operation

To establish the first forward electrically-variable mode, the torque-transmitting mechanisms 50 and 54 are engaged, the engine 12 is accelerated from the idle speed to a desired speed, and then the speed of the motor/generator 80 (operating as a generator) is decreased, and the speed of the motor/generator 82 (operating as a motor) is increased. This operation will continue until the speed of motor/generator 80 is zero, establishing a mechanical point. This is the end of the first forward electrically-variable mode of operation. This first electrically-variable mode of operation is an input-split type of power transmission. Referring to FIG. 2, the interconnections established in the transmission 14 during the first forward electrically-variable mode, via engagement of torque-transmitting mechanisms 50 and 54 are illustrated. Specifically, nodes D and G are both grounded to stationary member 84. The torque required at node C provided by motor/generator 80 is inversely proportional to the distance between nodes C and B (L1) relative to the distance between nodes A and B (L2), which denote the leverage of the motor/generator 80 and input member 16, respectively, about node B (which is the output member of the lever 20). The length of L1 is double the length of L2, so the torque required from the motor/generator 80 connected to node C is half of the torque provided at the input member 16 connected to node A.

At the first mechanical point of operation, with the speed of motor/generator 80 at zero, the node D is stationary, as held by the torque-transmitting mechanism 54, and the speed of the motor/generator 82 is also zero. At this point, the torque-transmitting mechanisms 54 and 56 can be interchanged in a synchronous condition, such that there is no slippage involved in either the engagement or disengagement of these devices. It should also be noted that at this point of operation, the transmission 14 is operating in a substantially mechanical power flow arrangement (hence the term "mechanical point"), the shaft power being transmitted by the electric motor/generators 80, 82 is negligible and the electrical losses from either motor/generator 80 or 82 are small. The first mechanical point is the end of the first electrically-variable mode and the beginning of the second electrically-variable mode.

Second Forward Electrically-Variable Mode of Operation

At the first mechanical point, the transmission may be controlled to shift from the first electrically-variable mode to a second electrically-variable mode, by disengaging torque-transmitting mechanism 54 and engaging torque-transmitting mechanism 56, with the operation of the motor/generator 82 thereby being changed from operating as a motor to operating as a generator. Also at this interchange point, the operation of motor/generator 80 changes from a generator mode to a motor mode. The speed of the engine 12 can be held at a desired speed throughout the second electrically-variable mode, or it can be varied as desired. To have the advantage of synchronous shifting from one mode to another, it is preferred that the ratio of the speed of the input member 16 to the speed of the output member 18 remains between that of the first mechanical point and that of the second mechanical point while the transmission 14 is operating in the second electrically-variable mode.

Figure 3:
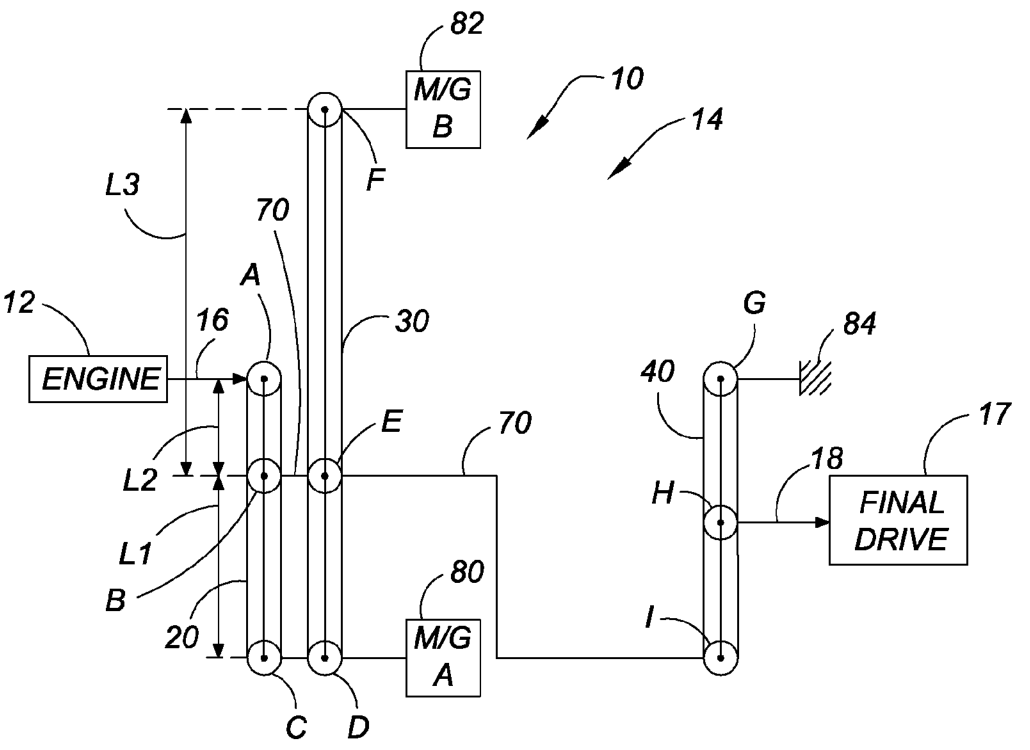
FIG. 3 is a schematic illustration of the embodiment of FIG. 1 in a second forward electrically-variable mode.

Referring to FIG. 3, the lever diagram resulting from the interconnections established in the transmission 14 during the second forward electrically-variable mode, via engagement of torque-transmitting mechanisms 50 and 56 is illustrated. Specifically, node G is grounded to stationary member 84, and motor/generator 80 and node C are connected for common rotation with node D. When two nodes of a three-node lever are connected with two other nodes of another three-node lever, the levers are collapsed together, with the connected nodes aligned, and the levers resealed as necessary in order to align the connected nodes, as is known to those skilled in the art. In the second electrically-variable mode, because nodes C and D are connected, as well as nodes B and E, the levers 20 and 30 are collapsed with the nodes B and E aligned, and the nodes C and D aligned, and the distance between nodes D and E lengthens from L2 to L1, causing the distance between nodes F and E to likewise double, from L1 to L3, which is twice the length of L1. Thus, the torque required at nodes C and D provided by motor/generator 80 is half the torque provided at the input member 16 by engine 12, when motor/generator 82 is not providing torque, as represented by the distance between nodes C and E (L1) relative to the distance between nodes A and B (L2). The torque required at node F by motor/generator 82 is one fourth of that provided at the input member 16, when motor/generator 80 is not providing torque, as represented by the distance between nodes F and E (L3) and the distance between nodes A and E (L2).

At the first mechanical point, which is in this embodiment the beginning the second electrically-variable mode, the motor/generator 80 can provide all of the torque necessary for reaction of the torque provided to the input member 16 without using or supplying mechanical power, because motor/generator 80 is stationary. At a second mechanical point, which is at the end of the second electrically-variable mode, the motor/generator 82 can supply all of the torque necessary for reaction of the torque provided to the input member 16 without using or supplying mechanical power, because motor/generator 82 is stationary. Between these two points, the motor/generators 80 and 82 share the task of providing reaction torque, such that this load can be transferred gradually from motor/generator 80 to motor/generator 82 through the second electrically-variable mode. In the absence of battery power and electrical accessory loads, this load is transferred so that electrical power generated by motor/generator 82 is consumed by motor/generator 80, so the net effect is simply to transmit power from the input member 16 to the output member 18.

To continue to accelerate the output member 18 (and a vehicle on which the transmission 14 is installed) during the second electrically-variable mode of operation, which is a compound-split mode, the speed of the motor/generator 80 (operating as a motor) is increased from zero in the forward direction and the speed of the motor/generator 82 (operating as a generator) is decreased. Both the motor/generator 80 and the engine 12 impart positive or forward rotation to the node B, and the motor/generator 82 provides a rotating reaction member at node F of the lever 30. The electrical energy generated by the motor/generator 82 can be utilized to either recharge a battery connected to the motor/generators 80, 82, provide electrical power to drive the motor/generator 80, or to do both depending upon the amount of power needed at the motor/generator 80 and the level of charge of the battery.

The powertrain 10 continues to operate in the second electrically-variable mode until the speed of the motor/generator 82 has decreased to zero and the speed of the motor/generator 80 has increased to a maximum value. At this point, the motor/generator 82 has a zero speed, which is equal to the speed of the node G as held stationary by the torque-transmitting mechanism 50. This is the second mechanical point, at which the torque-transmitting mechanisms 50 and 52 can be interchanged in a synchronous manner, wherein no slippage occurs during the ratio interchange. This is the end of the second forward electrically-variable mode of operation and the beginning of the third forward electrically-variable mode of operation.

Third Forward Electrically-Variable Mode of Operation

The third forward electrically-variable mode of operation is also a compound-split mode of operation. During the third forward electrically-variable mode of operation, the motor/generator 80 is operated as a generator and the motor/generator 82 is operated as a motor. The speed of motor/generator 80 decreases while the speed of the motor/generator 82 increases. Nodes G and H are both driven in a forward or positive direction. Node G is driven by the motor/generator 82, and node I is driven by both the engine 12 through the planetary gear set represented by lever 20 and the motor/generator 82 through the planetary gear set represented by lever 30.

Figure 4:
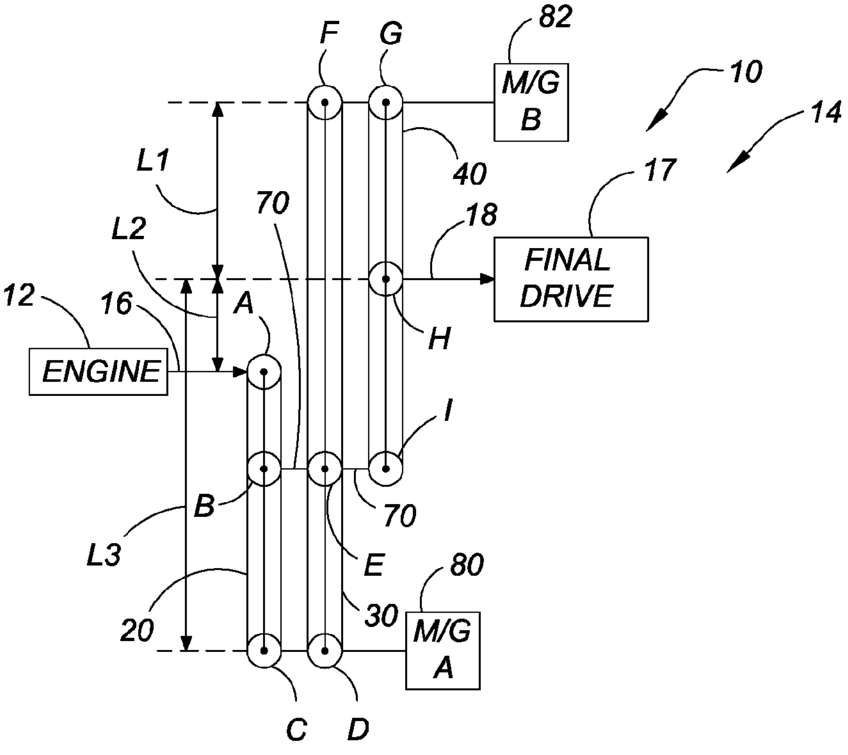
FIG. 4 is a schematic illustration of the embodiment of FIG. 1 in a third forward electrically-variable mode.

Referring to FIG. 4, the lever diagram resulting from the interconnections established in the transmission 14 during the third forward electrically-variable mode, via engagement of torque-transmitting mechanisms 52 and 56 is illustrated. Specifically, motor/generator 82 and node F are connected for common rotation with node G, and motor/generator 80 and node C are connected for common rotation with node D. Because two nodes of lever 20 are connected with two nodes of lever 30 and two nodes of lever 30 are connected with two nodes of lever 40, the levers 20, 30 and 40 are collapsed together, with the connected nodes aligned, and the levers 20, 30 and 40 are resealed as necessary in order to align the connected nodes. Thus, in the third electrically-variable mode, because nodes C and D are connected, nodes B, E and I are connected, as well as nodes F and G, the levers 20, 30 and 40 are collapsed with these respective nodes aligned, and the distance between nodes G and H and between nodes H and I increases from L to L1 in each instance. The torque required at nodes C and D provided by motor/generator 80 is one-fourth the torque provided at the input member 16 by engine 12, when motor/generator 82 is not providing torque, as represented by the relative distances L3 and L2. The torque required at node F by motor/generator 82 is half that provided at the input member 16, when motor/generator 80 is not providing torque, as represented by the relative distances L1 and L2, respectively.

Thus, the maximum torque required from motor/generator 80 to react a given torque provided by the engine 12 to the input member 16 during the first, second and third electrically-variable modes occurs during the first and second forward electrically-variable modes of operation, is half of the torque provided to the input member 16, and is identical to the maximum torque required from the motor/generator 82, which occurs during the third electrically-variable mode of operation. This equality in maximum torque is due to the selected gear ratios of the planetary gear sets represented by levers 20, 30 and 40, ratios which are 2.0, 2.0 and 1.0, respectively. Because the motor/generators 80, 82 have the same maximum torque requirement, they may be equal in size.

During the third forward electrically-variable mode of operation, the motor/generator 80 supplies electrical power to the transmission 14 which can be utilized to power the motor/generator 82 as a motor and/or provide energy to a battery connected thereto to increase the battery storage charge. The third forward electrically-variable mode of operation can continue until the powertrain 10 powers a vehicle to its maximum speed point, at which the speed of motor/generator 80 is zero, i.e., a third mechanical point.

The operating points at which the speed of one of the motor/generators 80, 82 is zero are important operating points in that each of these is a mechanical operating point where the amount of electrical energy being distributed through the powertrain 10 is at a minimum and the mechanical power flow is a maximum or greater percentage of the total power flow. As is well known, this results in a substantial increase in operating efficiency for the powertrain 10.

Fixed Ratio Modes

The transmission 14 also provides three fixed ratio modes of operation. A first fixed ratio mode is provided by engaging torque-transmitting mechanisms 50, 54 and 56, preferably at the first mechanical point established between the first and second forward electrically-variable modes, when the speed of motor/generator 80 is zero. A second fixed ratio mode is established by engaging torque-transmitting mechanisms 50, 52 and 56, preferably at the second mechanical point established between the second and third electrically-variable modes, when the speed of motor/generator 82 is zero. A third fixed ratio mode is established by engaging torque-transmitting mechanisms 52, 54 and 56, preferably at the third mechanical point when the speed of motor/generator 80 is zero.

The ratio spread of the second forward electrically-variable mode of operation is identical to the ratio spread of the third electrically-variable mode of operation. The speed ratio in the second electrically-variable mode ranges from 3.0 to 1.5, establishing a ratio spread of 2.0. As used herein, "speed ratio" means the speed of the input member divided by the speed of the output member of a transmission. As used herein, "ratio spread" means the speed ratio at the beginning of a range or mode relative to the speed ratio at the end of the range or mode. The speed ratio of the third electrically-variable mode ranges from 1.5 to 0.75, which is also a ratio spread of 2.0.

In FIGS. 1 through 4, the relative speeds of the members of each planetary gear set can be calculated using the distances between the nodes which represent those members on the lever. For the first fixed ratio mode, referring to FIG. 2, motor/generator 80, which is connected to node C on lever 20, is stationary, so the ratio between the speed of the input member 16, which is connected to node A, and the interconnecting member 70 which is connected to node B, is the ratio of the distance from node A to node C, the sum of L1 and L2, to the distance from node B to node C, L1, which is the ratio three to two for a lever representing a planetary gear set with an effective gear ratio of 2.0. The ratio between the interconnecting member 70 and the output member 18 may be found in the same way using lever 40 and the ratio of the distances from node I to node G (stationary), to the distance from node H to node G, with the result of two to one for a planetary gear set with a ratio of 1.0. The overall speed ratio for the first fixed ratio mode is then the product of these two ratios, a speed ratio of 3.0.

For the second fixed ratio mode, referring to FIG. 3, motor/generator 82 is stationary, so the speed ratio between the input member 16, which is connected for common rotation with node A, and the interconnecting member 70, which is connected for common rotation with node E, is the ratio of the distance from node A to node F, L1 plus L2, to the distance from node E to node F, which is the ratio of three to four for the collapsed levers 20, 30, representing the interconnected planetary gear sets each with an effective gear ratio of 2.0. The ratio of the distance between the interconnecting member 70 and the stationary node G to the distance between the output member 18 and the stationary node G may be found in the same way using lever 40 with the result of two to one for a planetary gear set with an effective gear ratio of 1.0. The overall speed ratio for the second forward fixed ratio mode is the product of these two ratios, a speed ratio of 1.5.

For the third fixed ratio mode, referring to FIG. 4, motor/generator 80 is stationary, so the overall speed ratio through the transmission is the ratio of the distance from node A to nodes C and D, which are connected to the input member 16 and motor/generator 80, respectively, which is the sum of L1 and L2 (see FIG. 3), to the distance from node H to nodes C and D, which are connected to the output member 18 and motor/generator 80, respectively, which is L3. Thus, the third fixed ratio mode has a speed ratio of four to three, which is 0.75.

Specific Embodiments of Transmission of FIGS. 1-4

First Specific Embodiment

Figure 5:
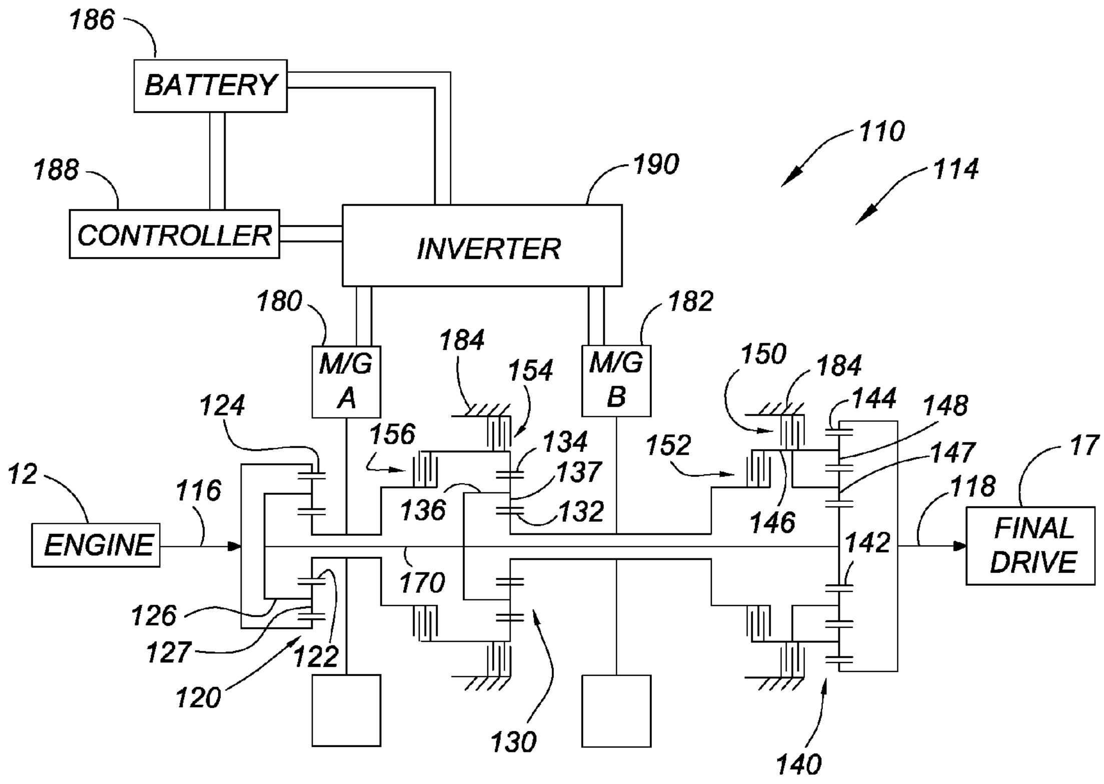
FIG. 5 is a schematic illustration of an embodiment of the transmission of FIG. 1 in stick-diagram form.

A powertrain 110, shown in FIG. 5, provides a specific embodiment of a transmission 114 representable by and operable in the same manner as the powertrain 10 shown in lever diagram form in FIGS. 1-4. Powertrain 110 includes the engine 12, the final drive mechanism 17, and an electrically-variable transmission 114 with an input member 116 connected for rotation with the engine 12 and an output member 118 connected for rotation with the final drive mechanism 17. The transmission 114 includes three planetary gear sets 120, 130, and 140, represented in FIGS. 1-4 as levers 20, 30 and 40, respectively.

The planetary gear set 120 includes a sun gear member 122, a ring gear member 124, and a carrier member 126. The carrier member 126 rotatably supports a plurality of pinion gears 127 that are disposed in meshing relationship with both the sun gear member 122 and the ring gear member 124. The ring gear member 124 has 86 teeth and the sun gear member 122 has 44 teeth, establishing an effective gear ratio of 2.0 for the planetary gear set 120.

The planetary gear set 130 includes a sun gear member 132, a ring gear member 134, and a carrier member 136 that rotatably supports a plurality of pinion gears 137 that are disposed in meshing relationship with both the sun gear member 132 and the ring gear member 134. The ring gear member 134 has 86 teeth and the sun gear member 132 has 44 teeth, establishing an effective gear ratio of 2.0 for the planetary gear set 130.

The planetary gear set 140 includes a sun gear member 142, a ring gear member 144, and a carrier member 146. The carrier member 146 rotatably supports a first set of pinion gears 147 as well as a second set of pinion gears 148. The first set of pinion gears 147 are disposed in meshing relationship with both the sun gear member 142 and the second set of pinion gears 148. The second set of pinion gears 148 is disposed in meshing relationship with the first set of pinion gears 147 and with the ring gear member 144. Thus, the planetary gear set 140 is a compound, sun gear member-pinion gear-pinion gear-ring gear member gear set, referred to herein as a S-P-P-R gear set. The ring gear member 144 has 104 teeth and the sun gear member 142 has 44 teeth. The effective gear ratio of a S-P-P-R gear set such as planetary gear set 140 is:

$(N_R/N_S)-1$; the ratio of the number of teeth of the ring gear member 144 to the number of teeth of the sun gear member 142, less one.

In the S-P-P-R gear set 140, the speed of the ring gear member 144 is the weighted average of the speeds of the sun gear member 142 and the carrier member 146. The torque into the sun gear member 142 and the torque into the carrier member 146 sum to the torque out of the ring gear member 144. The ring gear member 144 has 104 teeth and the sun gear member 142 has 44 teeth, establishing an effective gear ratio of 1.36 for the gear set 140.

An interconnecting member 170 continuously connects the carrier member 126, the carrier member 136, and the sun gear member 142. The interconnecting member 170 may alternatively be two separate components, one connecting the carrier members 126 and 136, and another connecting carrier member 136 with sun gear member 142.

The ring gear member 124, carrier member 126 and sun gear member 122 correspond with nodes A, B and C, respectively, of FIGS. 1-4. The ring gear member 134, carrier member 136 and sun gear member 132 correspond with nodes D, E and F, respectively. The carrier member 146, the ring gear member 144, and the sun gear member 142 correspond with nodes G, H and I, respectively.

The electrically-variable transmission 114 also includes two motor/generators 180 and 182 that may receive electrical power from or provide electrical power to an energy storage device 186 such as a battery. An electronic controller 188 is in signal communication with the battery 186 and with a power inverter 190 that is also in electrical communication with the stator portions of the motor/generators 180, 182. The controller 188 responds to a variety of input signals including vehicle speed, operator demand, the level at which the battery 186 is charged and the power being provided by the engine 12 to regulate the flow of power between the motor/generators 180, 182 and the battery 186 via the inverter 190, which converts between direct current provided or utilized by the battery 186 and alternating current provided or utilized by the stator portions of the motor/generators 180, 182.

The electrically-variable transmission 114 also includes a plurality of torque-transmitting mechanisms 150, 152, 154 and 156. Torque-transmitting mechanism 150 is selectively engagable to ground the carrier member 146 to a stationary member 184. Torque-transmitting mechanism 152 is selectively engagable to connect sun gear member 132 and motor/generator 182 for common rotation with carrier member 146. Torque-transmitting mechanism 154 is selectively engagable to ground the ring gear member 134 to the stationary member 184. Torque-transmitting mechanism 156 is selectively engagable to connect the motor/generator 180 and the ring gear member 134 for common rotation.

The operation of the powertrain 110 is the same as the operation of the powertrain 10, depicted in FIG. 1. That is, engagement of torque-transmitting mechanisms 150 and 154 establish a first forward electrically-variable mode, engagement of torque-transmitting mechanisms 150 and 156 establish a second forward electrically-variable mode, and engagement of torque-transmitting mechanisms 152 and 156 establish a third forward electrically-variable mode. The transmission 14 also provides three fixed ratio modes of operation. A first fixed ratio mode is provided by engaging torque-transmitting mechanisms 150, 154 and 156 (providing a fixed speed ratio of 3.02), preferably at the first mechanical point established between the first and second forward electrically-variable modes. A second fixed ratio mode is established by engaging torque-transmitting mechanisms 150, 152 and 156 (providing a fixed ratio of 1.48), preferably at the second mechanical point established between the second and third electrically-variable modes. A third fixed ratio mode is established by engaging torque-transmitting mechanisms 152, 154 and 156 (providing a fixed ratio of 0.76), preferably at the third mechanical point when the speed of motor/generator 80 is zero.

Moreover, the maximum torque required from motor/generator 180 is the same as that required from motor/generator 182, allowing them to be of identical size, as described with respect to the representative lever diagrams of FIGS. 1-4. Furthermore, a substantially identical ratio spread is established in the second and third electrically-variable modes.

Second Specific Embodiment

Figure 6:
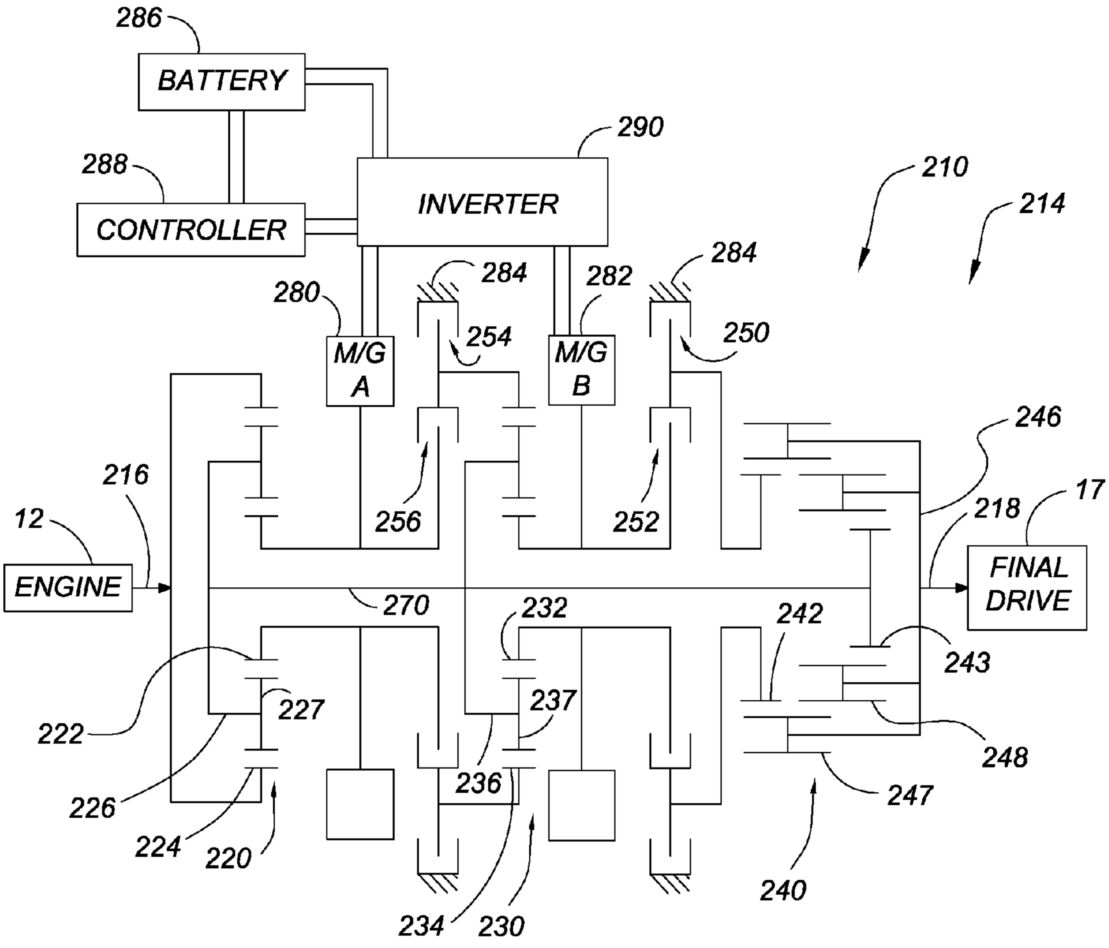
FIG. 6 is a schematic illustration of another embodiment of the transmission of FIG. 1 in stick-diagram form.

A powertrain 210, shown in FIG. 6, provides a specific embodiment of a transmission 214 representable by and operable in the same manner as the powertrain 10 shown in lever diagram form in FIGS. 1-4. Powertrain 210 includes the engine 12, the final drive mechanism 17, and an electrically-variable transmission 214 with an input member 216 connected for rotation with the engine 12 and an output member 218 connected for rotation with the final drive mechanism 17. The transmission 214 includes three planetary gear sets 220, 230, and 240, represented in FIGS. 1-4 as levers 20, 30 and 40, respectively.

The planetary gear set 220 includes a sun gear member 222, a ring gear member 224, and a carrier member 226. The carrier member 226 rotatably supports a plurality of pinion gears 227 that are disposed in meshing relationship with both the sun gear member 222 and the ring gear member 224. The ring gear member 224 has 86 teeth and the sun gear member 222 has 44 teeth, establishing an effective gear ratio of 2.0 for the planetary gear set 220.

The planetary gear set 230 includes a sun gear member 232, a ring gear member 234, and a carrier member 236 that rotatably supports a plurality of pinion gears 237 that are disposed in meshing relationship with both the sun gear member 232 and the ring gear member 234. The ring gear member 234 has 86 teeth and the sun gear member 232 has 44 teeth, establishing an effective gear ratio of 2.0 for the planetary gear set 230.

The planetary gear set 240 includes a first sun gear member 242, a carrier member 246, first and second sets of pinion gears 247, 248 and a second sun gear member 243. The carrier member 246 rotatably supports the first set of pinion gears 247 as well as the second set of pinion gears 248. The first set of pinion gears 247 are disposed in meshing relationship with both the sun gear member 242 and the second set of pinion gears 248. The second set of pinion gears 248 are disposed in meshing relationship with the first set of pinion gears 247 and with the second sun gear member 243. Thus, the planetary gear set 240 is a compound, sun gear member-pinion gear-pinion gear-sun gear member gear set, which may be referred to herein as a S-P-P-S gear set. The effective gear ratio of a S-P-P-S gear set such as planetary gear set 240 is:

$Ns_L/Ns_S$, the ratio of the number of teeth of the larger sun gear member 242 ($Ns_L$) to the number of teeth of the smaller sun gear member 243 ($Ns_S$).

Thus, if the sun gear member 242 has 46 teeth and the sun gear member 243 has 40 teeth, the effective gear ratio of the planetary gear set 240 is 1.15. In the S-P-P-S gear set 240, the speed of the carrier member 246 is the weighted average of the speeds of the sun gear member 242 and the sun gear member 243. The torque into the sun gear member 242 and the torque into the sun gear member 243 sum to the torque out of the carrier member 246.

An interconnecting member 270 continuously connects the carrier member 226, the carrier member 236 and the sun gear member 243. The interconnecting member 270 may alternatively be two separate components, one connecting the carrier members 226 and 236, and another connecting carrier member 236 with sun gear member 243.

The ring gear member 224, carrier member 226 and sun gear member 222 correspond with nodes A, B and C, respectively, of FIGS. 1-4. The ring gear member 234, carrier member 236 and sun gear member 232 correspond with nodes D, E and F, respectively. The first sun gear member 242, the carrier member 246 and the second sun gear member 243 correspond with nodes G, H and I, respectively.

The electrically-variable transmission 214 also includes two motor/generators 280 and 282 that may receive electrical power from or provide electrical power to an energy storage device 286 such as a battery. An electronic controller 288 is in signal communication with the battery 286 and with a power inverter 290 that is also in electrical communication with the stator portions of the motor/generators 280, 282. The controller 288 responds to a variety of input signals including vehicle speed, operator demand, the level at which the battery 286 is charged and the power being provided by the engine 12 to regulate the flow of power between the motor/generators 280, 282 and the battery 286 via the inverter 290, which converts between direct current provided or utilized by the battery 286 and alternating current provided or utilized by the stator portions of the motor/generators 280, 282.

The electrically-variable transmission 214 also includes a plurality of torque-transmitting mechanisms 250, 252, 254 and 256. Torque-transmitting mechanism 250 is selectively engagable to ground the sun gear member 242 to a stationary member 284. Torque-transmitting mechanism 252 is selectively engagable to connect sun gear member 232 and motor/generator 282 for common rotation with sun gear member 242. Torque-transmitting mechanism 254 is selectively engagable to ground the ring gear member 234 to the stationary member 284. Torque-transmitting mechanism 256 is selectively engagable to connect the motor/generator 280 and the ring gear member 234 for common rotation.

The operation of the powertrain 210 is the same as the operation of the powertrain 10, depicted in FIG. 1. That is, engagement of torque-transmitting mechanisms 250 and 254 establish a first forward electrically-variable mode, engagement of torque-transmitting mechanisms 250 and 256 establish a second forward electrically-variable mode, and engagement of torque-transmitting mechanisms 252 and 256 establish a third forward electrically-variable mode. The transmission 214 also provides three fixed ratio modes of operation. A first fixed ratio mode is provided by engaging torque-transmitting mechanisms 250, 254 and 256 (providing a fixed speed ratio of 3.25), preferably at the first mechanical point established between the first and second forward electrically-variable modes. A second fixed ratio mode is established by engaging torque-transmitting mechanisms 250, 252 and 256 (providing a fixed ratio of 1.58), preferably at the second mechanical point established between the second and third electrically-variable modes. A third fixed ratio mode is established by engaging torque-transmitting mechanisms 252, 254 and 256 (providing a fixed ratio of 0.74), preferably at the third mechanical point when the speed of motor/generator 280 is zero.

Moreover, the maximum torque required from motor/generator 280 is the same as that required from motor/generator 282, allowing them to be of identical size, as described with respect to the representative lever diagrams of FIGS. 1-4. Furthermore, a substantially identical ratio spread is established in the second and third electrically-variable modes.

Third Specific Embodiment

Figure 7:
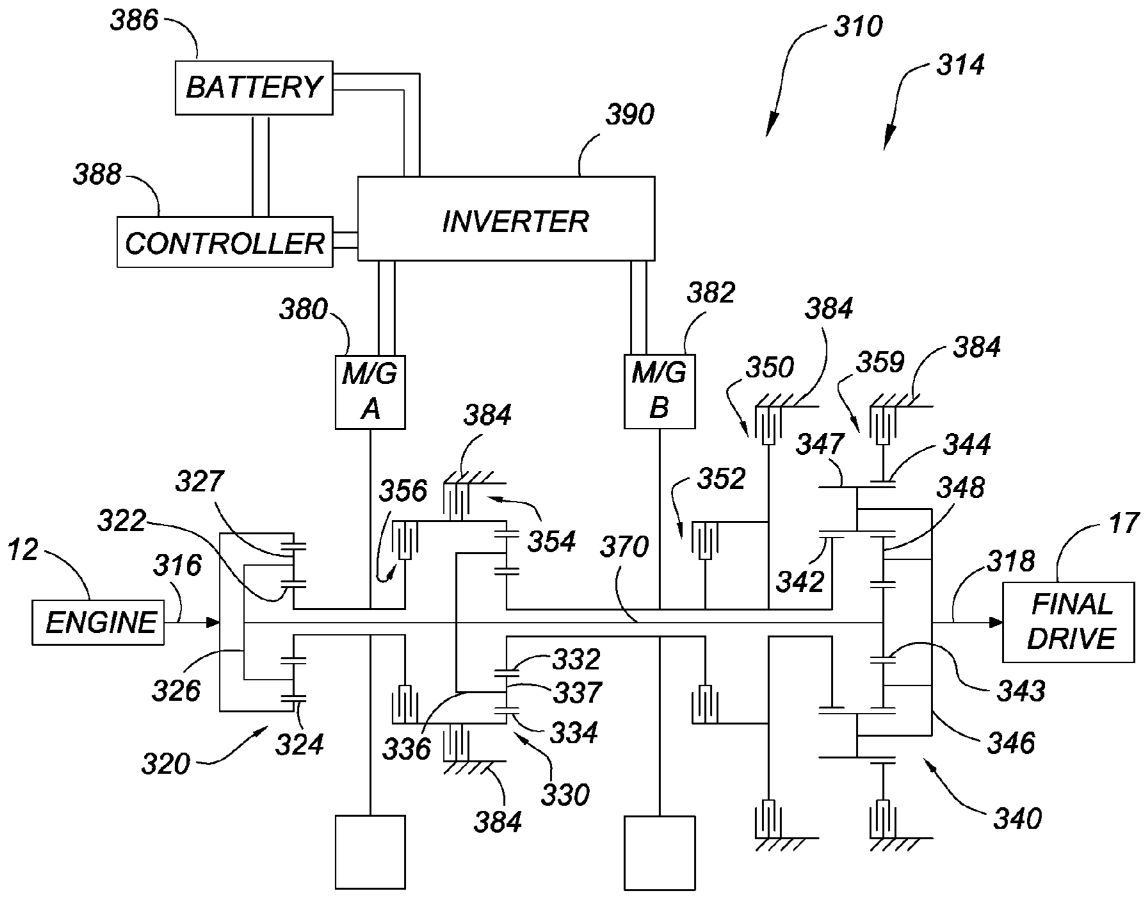
FIG. 7 is a schematic illustration of another embodiment of the transmission of FIG. 1 in stick-diagram form.

A powertrain 310, shown in FIG. 7, provides a specific embodiment of a transmission 314 representable by and operable in the same manner as the powertrain 10 shown in lever diagram form in FIGS. 1-4. The powertrain 310 is identical to the powertrain 210, except that a ring gear member 344, operable to implement a reverse speed ratio, and a brake-type torque-transmitting mechanism 359 are added, as discussed below. Also, the torque-transmitting mechanisms 354 and 356, and the torque-transmitting mechanisms 350 and 352, are offset from one another rather than radially aligned. Powertrain 310 includes the engine 12, the final drive mechanism 17, and an electrically-variable transmission 314 with an input member 316 connected for rotation with the engine 12 and an output member 318 connected for rotation with the final drive mechanism 17. The transmission 314 includes three planetary gear sets 320, 330, and 340, represented in FIGS. 1-4 as levers 20, 30 and 40, respectively.

The planetary gear set 320 includes a sun gear member 322, a ring gear member 324, and a carrier member 326. The carrier member 326 rotatably supports a plurality of pinion gears 327 that are disposed in meshing relationship with both the sun gear member 322 and the ring gear member 324. The ring gear member 324 has 86 teeth and the sun gear member 322 has 44 teeth, establishing an effective gear ratio of 2.0 for the planetary gear set 320.

The planetary gear set 330 includes a sun gear member 332, a ring gear member 334, and a carrier member 336 that rotatably supports a plurality of pinion gears 337 that are disposed in meshing relationship with both the sun gear member 332 and the ring gear member 334. The ring gear member 334 has 86 teeth and the sun gear member 332 has 44 teeth, establishing an effective gear ratio of 2.0 for the planetary gear set 330.

The planetary gear set 340 includes a first sun gear member 342, a carrier member 346, first and second sets of pinion gears 347, 348 and a second sun gear member 343. The carrier member 346 rotatably supports the first set of pinion gears 347 as well as the second set of pinion gears 348. The first set of pinion gears 347 is disposed in meshing relationship with both the sun gear member 342 and the second set of pinion gears 348. The second set of pinion gears 348 is disposed in meshing relationship with the first set of pinion gears 347 and with the second sun gear member 343. A ring gear member 344 is disposed in meshing relationship with the first set of pinion gears 347. A torque-transmitting mechanism 359 is selectively engagable to ground the ring gear member 344 to the stationary member 384. The torque-transmitting mechanism 359 is engaged only to establish a reverse direction of rotation of the carrier member 346, and thus provide a reverse speed ratio through the transmission. The torque-transmitting mechanism 359 is not engaged in any forward operating mode, and the ring gear member 344 spins freely with no effect on the effective gear ratio of the third planetary gear set 340 in such modes. Thus, for purposes of forward operating modes, the planetary gear set 340 functions as a compound, S-P-P-S gear set. The effective gear ratio of planetary gear set 340 in forward operating modes is:

$Ns_L/Ns_S$, the ratio of the number of teeth of the larger sun gear member 342 ($Ns_L$) to the number of teeth of the smaller sun gear member 343 ($Ns_S$).

Thus, if the sun gear member 342 has 46 teeth and the sun gear member 343 has 40 teeth, the effective gear ratio of the planetary gear set 340 is 1.15. In the S-P-P-S gear set 340, the speed of the carrier member 344 is the weighted average of the speeds of the sun gear member 342 and the sun gear member 343. The torque into the sun gear member 342 and the torque into the sun gear member 343 sum to the torque out of the carrier member 346.

An interconnecting member 370 continuously connects the carrier member 326, the carrier member 336 and the sun gear member 343. The interconnecting member 370 may alternatively be two separate components, one connecting the carrier members 326 and 336, and another connecting carrier member 336 with sun gear member 243.

The ring gear member 324, carrier member 326 and sun gear member 322 correspond with nodes A, B and C, respectively, of FIGS. 1-4. The ring gear member 334, carrier member 336 and sun gear member 332 correspond with nodes D, E and F, respectively. The first sun gear member 342, the carrier member 346 and the second sun gear member 343 correspond with nodes G, H and I, respectively.

The electrically-variable transmission 314 also includes two motor/generators 380 and 382 that may receive electrical power from or provide electrical power to an energy storage device 386 such as a battery. An electronic controller 388 is in signal communication with the battery 386 and with a power inverter 390 that is also in electrical communication with the stator portions of the motor/generators 380, 382. The controller 388 responds to a variety of input signals including vehicle speed, operator demand, the level at which the battery 386 is charged and the power being provided by the engine 12 to regulate the flow of power between the motor/generators 380, 382 and the battery 386 via the inverter 390, which converts between direct current provided or utilized by the battery 386 and alternating current provided or utilized by the stator portions of the motor/generators 380, 382.

The electrically-variable transmission 314 also includes a plurality of torque-transmitting mechanisms 350, 352, 354, 356 and 359. Torque-transmitting mechanism 350 is selectively engagable to ground the sun gear member 342 to a stationary member 384. Torque-transmitting mechanism 352 is selectively engagable to connect sun gear member 332 and motor/generator 382 for common rotation with sun gear member 342. Torque-transmitting mechanism 354 is selectively engagable to ground the ring gear member 334 to the stationary member 384. Torque-transmitting mechanism 356 is selectively engagable to connect the motor/generator 380 and the ring gear member 334 for common rotation. Torque-transmitting mechanism 359 is selectively engagable to ground the ring gear member 344 to the stationary member 384. In comparison with the transmission 214 of FIG. 6, the torque-transmitting mechanisms 354 and 350 are offset from torque-transmitting mechanisms 356 and 352, respectively, rather than being radially aligned therewith. This arrangement may permit the motor/generators 380, 382 to be packaged nearer one another than motor/generators 280, 282, thus minimizing overall length of the transmission 314.

The operation of the powertrain 310 is the same as the operation of the powertrain 10, depicted in FIG. 1, except that a reverse electrically-variable mode is provided, as described below. Engagement of torque-transmitting mechanisms 350 and 354 establish a first forward electrically-variable mode, engagement of torque-transmitting mechanisms 350 and 356 establish a second forward electrically-variable mode, and engagement of torque-transmitting mechanisms 352 and 356 establish a third forward electrically-variable mode. Engagement of torque-transmitting mechanisms 350, 354 and 359 establishes a reverse electrically-variable mode of operation, as the grounded ring gear member 344 provides reaction torque to change the direction of rotation of the first set of pinion gears 347 such that the carrier member 346 and output member 318 rotate in a reverse direction. The transmission 314 also provides three fixed ratio modes of operation. A first fixed ratio mode is provided by engaging torque-transmitting mechanisms 350, 354 and 356 (providing a fixed speed ratio of 3.25), preferably at the mechanical point established between the first and second forward electrically-variable modes. A second fixed ratio mode is established by engaging torque-transmitting mechanisms 350, 352 and 356 (providing a fixed ratio of 1.58), preferably at the mechanical point established between the second and third electrically-variable modes. A third fixed ratio mode is established by engaging torque-transmitting mechanisms 352, 354 and 356 (providing a fixed ratio of 0.74), preferably at the third mechanical point when the speed of motor/generator 380 is zero.

Moreover, the maximum torque required from motor/generator 380 is the same as that required from motor/generator 382, allowing them to be of identical size, as described with respect to the representative lever diagrams of FIGS. 1-4. Furthermore, a substantially identical ratio spread is established in the second and third electrically-variable modes.

Fourth Specific Embodiment

Figure 8:
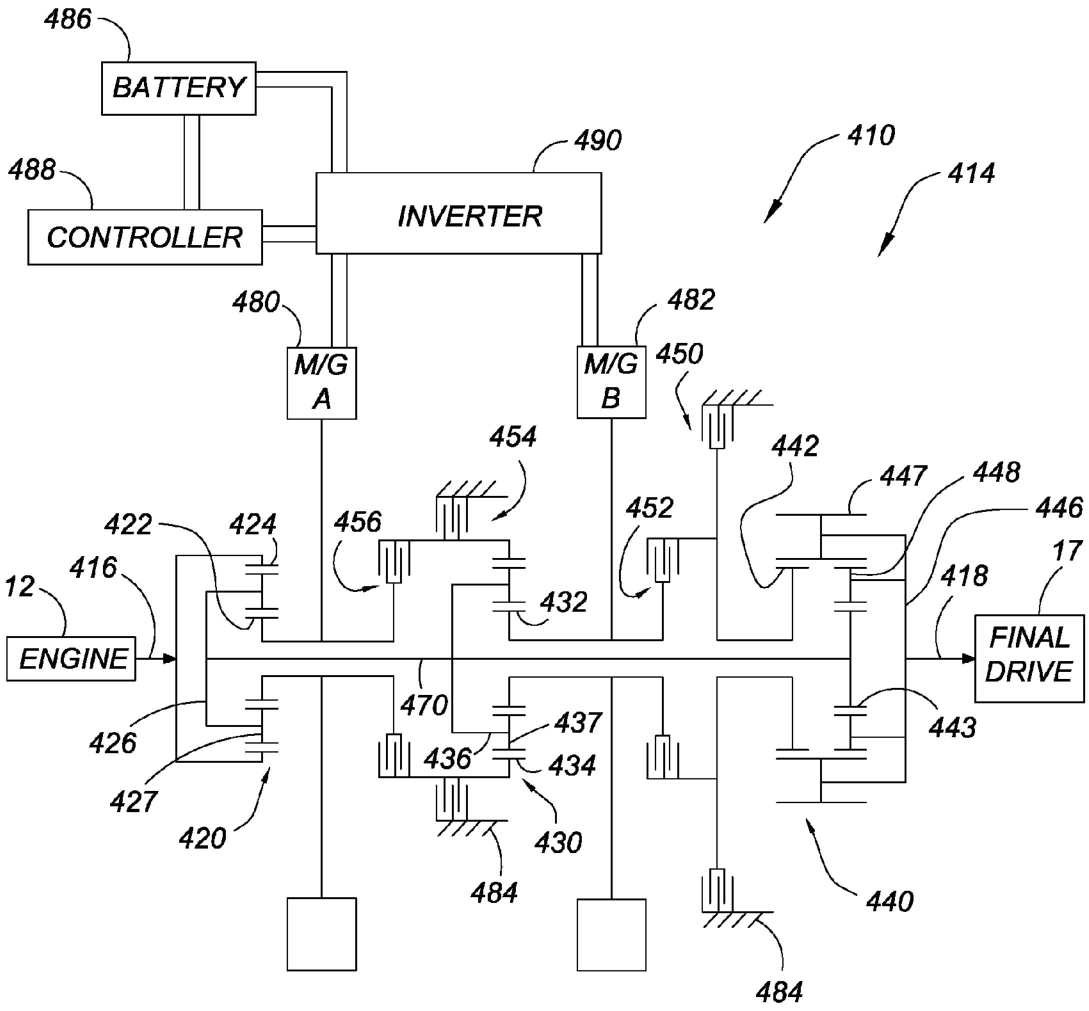
FIG. 8 is a schematic illustration of another embodiment of the transmission of FIG. 1 in stick-diagram form.

A powertrain 410, shown in FIG. 8, provides a specific embodiment of a transmission 414 representable by and operable in the same manner as the powertrain 10 shown in lever diagram form in FIGS. 1-4. Powertrain 410 is identical to powertrain 210 shown in FIG. 6, except for differences in location of torque-transmitting mechanisms, as discussed below. Powertrain 410 includes the engine 12, the final drive mechanism 17, and an electrically-variable transmission 414 with an input member 416 connected for rotation with the engine 12 and an output member 418 connected for rotation with the final drive mechanism 17. The transmission 414 includes three planetary gear sets 420, 430, and 440, represented in FIGS. 1-4 as levers 20, 30 and 40, respectively.

The planetary gear set 420 includes a sun gear member 422, a ring gear member 424, and a carrier member 426. The carrier member 426 rotatably supports a plurality of pinion gears 427 that are disposed in meshing relationship with both the sun gear member 422 and the ring gear member 424. The ring gear member 424 has 86 teeth and the sun gear member 422 has 44 teeth, establishing an effective gear ratio of 2.0 for the planetary gear set 420.

The planetary gear set 430 includes a sun gear member 432, a ring gear member 434, and a carrier member 436 that rotatably supports a plurality of pinion gears 437 that are disposed in meshing relationship with both the sun gear member 432 and the ring gear member 434. The ring gear member 434 has 86 teeth and the sun gear member 432 has 44 teeth, establishing an effective gear ratio of 2.0 for the planetary gear set 430.

The planetary gear set 440 includes a first sun gear member 442, a carrier member 446, first and second sets of pinion gears 447, 448 and a second sun gear member 443. The carrier member 446 rotatably supports the first set of pinion gears 447 as well as the second set of pinion gears 448. The first set of pinion gears 447 is disposed in meshing relationship with both the sun gear member 442 and the second set of pinion gears 448. The second set of pinion gears 448 is disposed in meshing relationship with the first set of pinion gears 447 and with the second sun gear member 443. Thus, the planetary gear set 440 is a compound, S-P-P-S gear set. The effective gear ratio of a S-P-P-S gear set such as planetary gear set 440 is:

$Ns_L/Ns_S$, the ratio of the number of teeth of the larger sun gear member 442 ($Ns_L$) to the number of teeth of the smaller sun gear member 443 ($Ns_S$).

Thus, if the sun gear member 442 has 46 teeth and the sun gear member 443 has 40 teeth, the effective gear ratio of the planetary gear set 440 is 1.15. In the S-P-P-S gear set 440, the speed of the carrier member 444 is the weighted average of the speeds of the sun gear member 442 and the sun gear member 443. The torque into the sun gear member 442 and the torque into the sun gear member 443 sum to the torque out of the carrier member 446.

An interconnecting member 470 continuously connects the carrier member 426, the carrier member 436 and the sun gear member 443. The interconnecting member 470 may alternatively be two separate components, one connecting the carrier members 426 and 436, and another connecting carrier member 436 with sun gear member 443.

The ring gear member 424, carrier member 426 and sun gear member 422 correspond with nodes A, B and C, respectively, of FIGS. 1-4. The ring gear member 434, carrier member 436 and sun gear member 432 correspond with nodes D, E and F, respectively. The first sun gear member 442, the carrier member 446 and the second sun gear member 443 correspond with nodes G, H and I, respectively.

The electrically-variable transmission 414 also includes two motor/generators 480 and 482 that may receive electrical power from or provide electrical power to an energy storage device 486 such as a battery. An electronic controller 488 is in signal communication with the battery 486 and with a power inverter 490 that is also in electrical communication with the stator portions of the motor/generators 480, 482. The controller 488 responds to a variety of input signals including vehicle speed, operator demand, the level at which the battery 486 is charged and the power being provided by the engine 12 to regulate the flow of power between the motor/generators 480, 482 and the battery 486 via the inverter 490, which converts between direct current provided or utilized by the battery 486 and alternating current provided or utilized by the stator portions of the motor/generators 480, 482.

The electrically-variable transmission 414 also includes a plurality of torque-transmitting mechanisms 450, 452, 454 and 456. Torque-transmitting mechanism 450 is selectively engagable to ground the sun gear member 442 to a stationary member 484. Torque-transmitting mechanism 452 is selectively engagable to connect sun gear member 432 and motor/generator 482 for common rotation with sun gear member 442. Torque-transmitting mechanism 454 is selectively engagable to ground the ring gear member 434 to the stationary member 484. Torque-transmitting mechanism 456 is selectively engagable to connect the motor/generator 480 and the ring gear member 434 for common rotation. In comparison with the transmission 214 of FIG. 6, the torque-transmitting mechanisms 454 and 450 are offset from torque-transmitting mechanisms 456 and 452, respectively, rather than being radially aligned therewith. This arrangement may permit the motor/generators 480, 482 to be packaged nearer one another than motor/generators 280, 282, thus minimizing overall length of the transmission 414.

The operation of the powertrain 410 is the same as the operation of the powertrain 10, depicted in FIG. 1. That is, engagement of torque-transmitting mechanisms 450 and 454 establish a first forward electrically-variable mode, engagement of torque-transmitting mechanisms 450 and 456 establish a second forward electrically-variable mode, and engagement of torque-transmitting mechanisms 452 and 456 establish a third forward electrically-variable mode. The transmission 414 also provides three fixed ratio modes of operation. A first fixed ratio mode is provided by engaging torque-transmitting mechanisms 450, 454 and 456 (providing a fixed speed ratio of 3.25), preferably at the first mechanical point established between the first and second forward electrically-variable modes. A second fixed ratio mode is established by engaging torque-transmitting mechanisms 450, 452 and 456 (providing a fixed ratio of 1.58), preferably at the second mechanical point established between the second and third electrically-variable modes. A third fixed ratio mode is established by engaging torque-transmitting mechanisms 452, 454 and 456 (providing a fixed ratio of 0.74), preferably at the third mechanical point when the speed of motor/generator 480 is zero.

Moreover, the maximum torque required from motor/generator 480 is the same as that required from motor/generator 482, allowing them to be of identical size, as described with respect to the representative lever diagrams of FIGS. 1-4. Furthermore, a substantially identical ratio spread is established in the second and third electrically-variable modes.

Fifth Specific Embodiment

Figure 9:
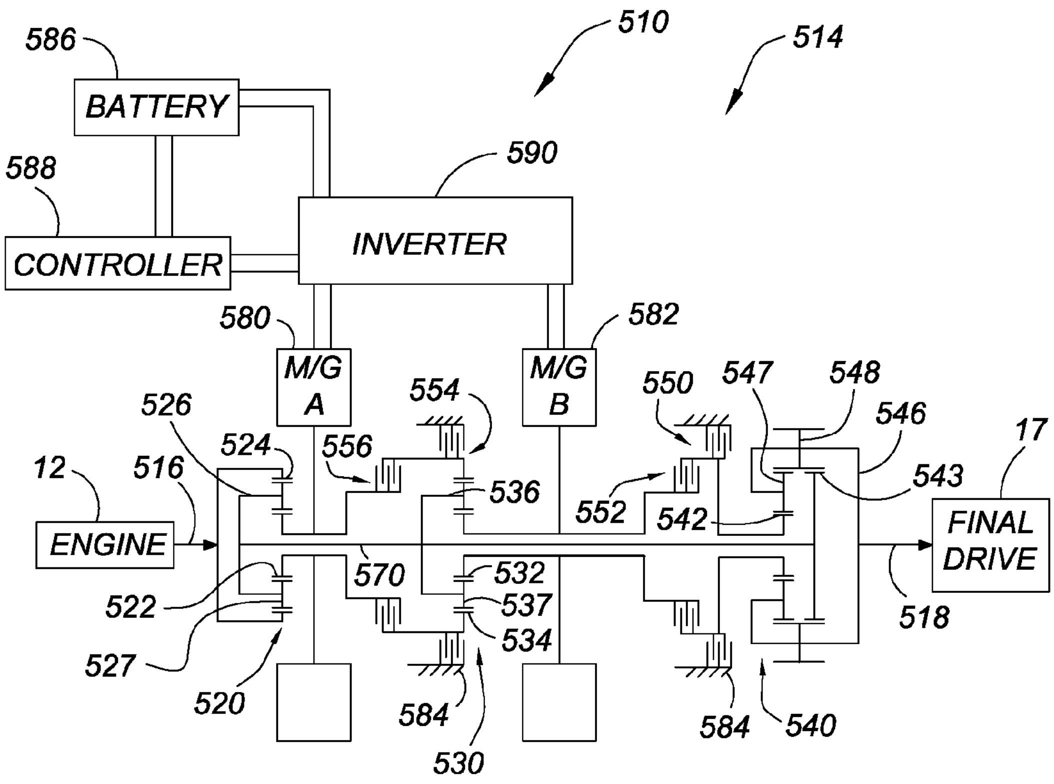
FIG. 9 is a schematic illustration of another embodiment of the transmission of FIG. 1 in stick-diagram form.

A powertrain 510, shown in FIG. 9, provides a specific embodiment of a transmission 514 representable by and operable in the same manner as the powertrain 10 shown in lever diagram form in FIGS. 1-4. Powertrain 510 is identical to powertrain 210 shown in FIG. 6, except for differences in location of torque-transmitting mechanisms, and the relative sizes and arrangement of the components of the planetary gear set 540, as discussed below. Powertrain 510 includes the engine 12, the final drive mechanism 17, and an electrically-variable transmission 514 with an input member 516 connected for rotation with the engine 12 and an output member 518 connected for rotation with the final drive mechanism 17. The transmission 514 includes three planetary gear sets 520, 530, and 540, represented in FIGS. 1-4 as levers 20, 30 and 40, respectively.

The planetary gear set 520 includes a sun gear member 522, a ring gear member 524, and a carrier member 526. The carrier member 526 rotatably supports a plurality of pinion gears 527 that are disposed in meshing relationship with both the sun gear member 522 and the ring gear member 524. The ring gear member 524 has 86 teeth and the sun gear member 522 has 44 teeth, establishing an effective gear ratio of 2.0 for the planetary gear set 520.

The planetary gear set 530 includes a sun gear member 532, a ring gear member 534, and a carrier member 536 that rotatably supports a plurality of pinion gears 537 that are disposed in meshing relationship with both the sun gear member 532 and the ring gear member 534. The ring gear member 534 has 86 teeth and the sun gear member 532 has 44 teeth, establishing an effective gear ratio of 2.0 for the planetary gear set 530.

The planetary gear set 540 includes a first sun gear member 542, a carrier member 546, first and second sets of pinion gears 547, 548 and a second sun gear member 543. The carrier member 546 rotatably supports the first set of pinion gears 547 as well as the second set of pinion gears 548. The first set of pinion gears 547 is disposed in meshing relationship with both the sun gear member 542 and the second set of pinion gears 548. The second set of pinion gears 548 is disposed in meshing relationship with the first set of pinion gears 547 and with the second sun gear member 543. Thus, the planetary gear set 540 is a compound, S-P-P-S gear set. The effective gear ratio of S-P-P-S gear set such as planetary gear set 540 is:

$Ns_L/Ns_S$, the ratio of the number of teeth of the larger sun gear member 543 ($Ns_L$) to the number of teeth of the smaller sun gear member 542 ($Ns_S$).

Thus, if the sun gear member 543 has 46 teeth and the sun gear member 542 has 40 teeth, the effective gear ratio of the planetary gear set 440 is 1.15. Because the smaller sun gear member 542 is selectively engagable to the stationary member 584 or to the motor/generator 582 and sun gear member 532, the planetary gear set 540 provides a smaller speed-reduction gear ratio in the first and second electrically-variable modes, in comparison with the planetary gear sets 240, 340 and 440 of FIGS. 6, 7, and 8, respectively. The numerical value of the fixed ratio modes are also affected, as discussed below. In the S-P-P-S gear set 540, the speed of the carrier member 544 is the weighted average of the speeds of the sun gear member 542 and the sun gear member 543. The torque into the sun gear member 542 and the torque into the sun gear member 543 sum to the torque out of the carrier member 546.

An interconnecting member 570 continuously connects the carrier member 526, the carrier member 536 and the sun gear member 543. The interconnecting member 570 may alternatively be two separate components, one connecting the carrier members 526 and 536, and another connecting carrier member 536 with sun gear member 543.

The ring gear member 524, carrier member 526 and sun gear member 522 correspond with nodes A, B and C, respectively, of FIGS. 1-4. The ring gear member 534, carrier member 536 and sun gear member 532 correspond with nodes D, E and F, respectively. The first sun gear member 542, the carrier member 546 and the second sun gear member 543 correspond with nodes G, H and I, respectively.

The electrically-variable transmission 514 also includes two motor/generators 580 and 582 that may receive electrical power from or provide electrical power to an energy storage device 586 such as a battery. An electronic controller 588 is in signal communication with the battery 586 and with a power inverter 590 that is also in electrical communication with the stator portions of the motor/generators 580, 582. The controller 588 responds to a variety of input signals including vehicle speed, operator demand, the level at which the battery 586 is charged and the power being provided by the engine 12 to regulate the flow of power between the motor/generators 580, 582 and the battery 586 via the inverter 590, which converts between direct current provided or utilized by the battery 586 and alternating current provided or utilized by the stator portions of the motor/generators 580, 582.

The electrically-variable transmission 514 also includes a plurality of torque-transmitting mechanisms 550, 552, 554 and 556. Torque-transmitting mechanism 550 is selectively engagable to ground the sun gear member 542 to a stationary member 584. Torque-transmitting mechanism 552 is selectively engagable to connect sun gear member 532 and motor/ generator 582 for common rotation with sun gear member 542. Torque-transmitting mechanism 554 is selectively engagable to ground the ring gear member 534 to the stationary member 584. Torque-transmitting mechanism 556 is selectively engagable to connect the motor/generator 580 and the ring gear member 534 for common rotation. In comparison with the transmission 214 of FIG. 6, the torque-transmitting mechanisms 554 and 550 are offset from torque-transmitting mechanisms 556 and 552, respectively, rather than being radially aligned therewith. This arrangement may permit the motor/generators 580, 582 to be packaged nearer one another than motor/generators 580, 582, thus minimizing overall length of the transmission 514.

The operation of the powertrain 510 is the same as the operation of the powertrain 10, depicted in FIG. 1. That is, engagement of torque-transmitting mechanisms 550 and 554 establish a first forward electrically-variable mode, engagement of torque-transmitting mechanisms 550 and 556 establish a second forward electrically-variable mode, and engagement of torque-transmitting mechanisms 552 and 556 establish a third forward electrically-variable mode. The transmission 514 also provides three fixed ratio modes of operation. A first fixed ratio mode is provided by engaging torque-transmitting mechanisms 550, 554 and 556 (providing a fixed speed ratio of 2.82), preferably at the mechanical point established between the first and second forward electrically-variable modes. A second fixed ratio mode is established by engaging torque-transmitting mechanisms 550, 552 and 556 (providing a fixed ratio of 1.38), preferably at the mechanical point established between the second and third electrically-variable modes. A third fixed ratio mode is established by engaging torque-transmitting mechanisms 552, 554 and 556 (providing a fixed ratio of 0.79), preferably at the third mechanical point when the speed of motor/generator 580 is zero.

Moreover, the maximum torque required from motor/generator 580 is the same as that required from motor/generator 582, allowing them to be of identical size, as described with respect to the representative lever diagrams of FIGS. 1-4. Furthermore, a substantially identical ratio spread is established in the second and third electrically-variable modes.

Second Lever Diagram Embodiment

Figure 10:
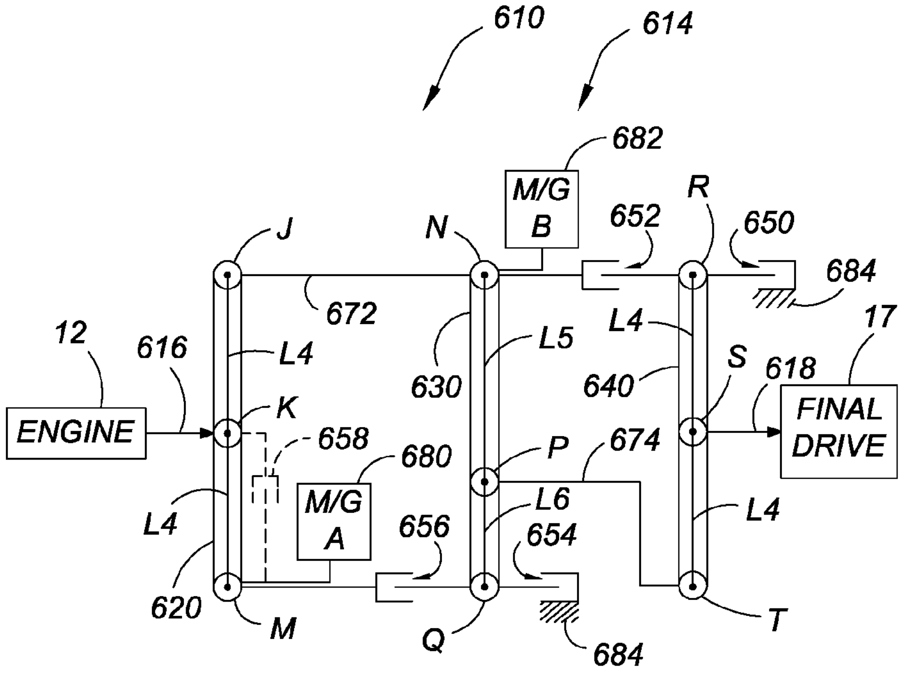
FIG. 10 is a schematic illustration of a second embodiment of an electrically-variable transmission depicted in lever diagram form.

FIG. 10 illustrates a powertrain 610 in lever diagram form. The powertrain 610 is configured differently than the powertrain 10 of FIG. 1. Due to the specifically chosen effective gear ratios of the planetary gear sets represented by levers 620, 630 and 640, powertrain 610 is operable to provide three forward electrically-variable modes with the same maximum torque requirement for each of motor/generators 680 and 682 over three forward operating modes. The powertrain 610 including an engine 12 connected to an electrically-variable transmission 614. The transmission 614 is designed to receive at least a portion of its driving power from the engine 12 in some of its operating modes, as discussed below. The engine has an output shaft that serves as an input member 616 of the transmission 614. A final drive unit 17 is operatively connected to an output member 618 of the transmission 614.

The transmission 614 includes a three-node lever 620 representing a first planetary gear set having a first, a second and a third member, represented by nodes J, K and M, respectively. The members may be a ring gear member, a sun gear member and a carrier member, although not necessarily in that order The transmission 614 further includes another three-node lever 630 representing a second planetary gear set having a first, a second and a third member, represented by nodes N, P, Q, respectively. The nodes N, P, and Q each represent a ring gear member, a sun gear member, and a carrier member, although not necessarily in that order. The transmission 614 also includes another three-node lever 640 representing a third planetary gear set having first, second, and third nodes R, S and T, respectively. The nodes R, S, and T each represent a ring gear member, a sun gear member, and a carrier member, although not necessarily in that order.

The transmission 614 has several fixed interconnections. An interconnecting member 672 continuously connects nodes J and N for common rotation. An interconnecting member 674 continuously connects nodes P and T for common rotation. The interconnecting members 672 and 674 may be shafts with hubs connected thereto, with the shafts and hubs being integral or unitary. A motor/generator 680 (also referred to as M/G A) is continuously connected with node M. The input member 616 is connected for common rotation with node K. Another motor/generator 682 (also referred to as M/G B) is connected for common rotation with node N. Node S is connected for common rotation with the output member 618. As will be understood by those skilled in the art, the motor/generators 680, 682 each have a rotor that is rotatable and a stator that is continuously grounded to a stationary member, such as a casing of the transmission 614. As is discussed further below, the transmission 614 is configured such that the motor/generators 680 and 682 are subjected to a substantially equal maximum torque requirement that is required of each respective motor/generator at some point during three forward electrically-variable modes. This allows the motor/generators 680, 682 to have a substantially equal, minimal size.

The transmission 614 also has several selectively engagable torque-transmitting mechanisms that provide various operating modes, as described below. Torque-transmitting mechanism 650, a stationary clutch, also referred to as a brake, is selectively engagable to ground node R with a stationary member 684, such as a casing of the transmission 614. Torque-transmitting mechanism 652, a rotating clutch, is selectively engagable to connect node N and motor/generator 682 for common rotation with node R. Another torque-transmitting mechanism 654, a stationary clutch, is selectively engagable to ground node Q to the stationary member 684. Finally, torque-transmitting mechanism 656, a rotating clutch, is selectively engagable to connect node M and motor/generator 680 for common rotation with node Q.

An additional, optional torque-transmitting mechanism 658 (shown in phantom in FIG. 10 to denote that it is optional) may be included to provide additional operating modes, as described below. Torque-transmitting mechanism 658, a rotating clutch, is selectively engagable to connect node K for common rotation with node M. By connecting the two members of the planetary gear set represented by the nodes K and M of lever 620, engagement of torque-transmitting mechanism 658 causes all members of the planetary gear set represented by lever 620 to rotate at the same speed, thus functioning as a lock-up clutch.

If the torque-transmitting mechanism 650 is engaged, node R is a reaction member within the planetary gear set represented by lever 640, and power will be transmitted via interconnecting member 674 through node T to node S and therefore to the output member 618. When the torque-transmitting mechanism 652 is engaged, the motor/generator 682 receives power from or delivers power to node R as well as node N. When the torque-transmitting mechanism 654 is engaged, node Q is held stationary and becomes a reaction member within the planetary gear set represented by lever 630. When the torque-transmitting mechanism 656 is engaged, the motor/generator 680 and node M are connected for rotation with node Q. When torque-transmitting mechanism 658 is engaged, the planetary gear set represented by lever 620 is locked-up, such that the speed of the input member is supplied to node N.

Figure 11:
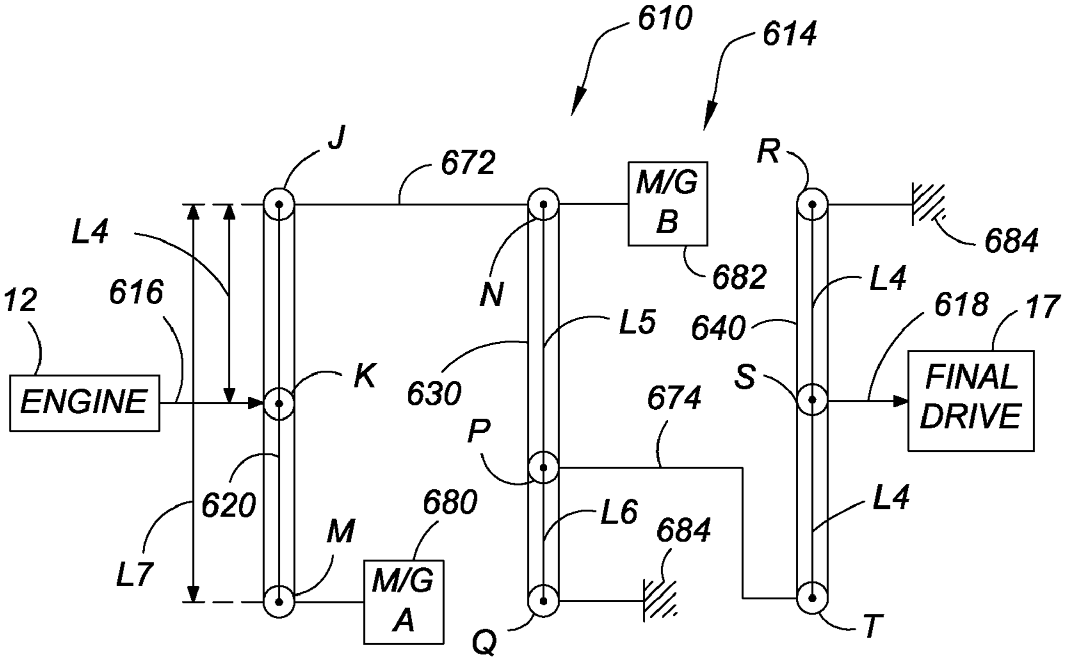
FIG. 11 is a schematic illustration of the embodiment of FIG. 10 in a first forward electrically-variable mode.

The transmission 614 achieves several operating modes, including three forward electrically-variable modes, each illustrated in FIGS. 11-13, respectively, as further detailed below. The transmission embodiment of FIG. 14 is an implementation of the lever diagram transmission 614, and operates in like manner as the transmission 614. Engagement of the torque-transmitting mechanisms 650, 652, 654 and 656 in combinations of two establishes three forward electrically-variable modes of operation. The engagement of torque-transmitting mechanisms 650 and 654 establishes a first forward electrically-variable mode. The engagement of torque-transmitting mechanisms 650 and 656 establishes a second forward electrically-variable mode. The engagement of torque-transmitting mechanisms 652 and 656 establishes a third forward electrically-variable mode. Engagement of the torque-transmitting mechanisms 650, 652, 654 and 656 in combinations of three establishes various fixed ratio operating modes. Engagement of torque-transmitting mechanism 658 in addition to each set of two torque-transmitting mechanisms that establish the respective electrically-variable modes permits a fixed ratio mode for each of these electrically-variable modes. The transmission 614 is capable of driving the output member 618 without action of the engine 12, that is while input member 616 is stationary, and is also capable of driving the output member 618 in reverse, in any of the electrically-variable modes by appropriate selection of the speeds of the electric motor/generators 680 and 682.

As discussed with respect to FIGS. 1-4, the dimensions of the segments of a lever (i.e., the relative spacing between nodes) are proportionate to, and representative of, the number of gear teeth on, or the working radii of, the gear members that determine the effective gear ratio of the planetary gear set represented by the lever. Referring to the transmission 614 of FIG. 10, the distance between nodes J and K is L4 while the distance between nodes K and M is also L4, creating an effective gear ratio of lever 620 as close as is practical to 1.0. The distance between nodes N and P is L5, which is selected to be twice the distance L6 between nodes P and Q. Thus, the effective gear ratio of lever 630 is 2.0. Node N has twice the leverage about node P as does node Q. The distance between nodes R and S is L4, the same as the distance between nodes S and T and the distance between nodes J and K and nodes K and M of lever 620. Thus, the effective gear ratio of lever 640 is as close as is practical to 1.0. Although it is impossible to build a simple planetary gear set with an effective gear ratio of 1.0 (because the dimension of the ring gear member would have to be the same as the dimensions of the sun gear member), by use of a compound planetary gear set, an effective gear ratio of 1.0 can be attained. Accordingly, levers 620 and 640 each represent compound planetary gear sets.

The first forward electrically-variable mode provided by transmission 614 is an input-split mode of operation, while the second and third electrically-variable modes are compound-split modes of operation. There are, of course, other combinations of engagements of the torque-transmitting mechanisms that will permit other operating conditions. For example, the motor/generator 680 can be utilized as a motor to provide starting torque for the engine 12. If all four of the torque-transmitting mechanisms 650, 652, 654 and 656 are engaged simultaneously, the input shaft 616 and the output shaft 618 are effectively grounded and therefore no power can be transmitted, thus producing a "park gear" arrangement if desired. The simultaneous disengagement of all of the torque-transmitting mechanisms provides a positive neutral condition.

For purposes of the following discussion, the rotational direction of the engine 12 will be considered forward or positive, and the rotational direction opposite the engine 12 will be considered reverse or negative. The transmission 614 is also capable of driving the output member 618 in reverse in any of the electrically-variable modes but would preferably operate in the first forward electrically-variable mode for reverse operation as well, simply by choosing a combination of speeds of the motor/generators 680 and 682 to cause reverse rotation of the output member 618.

First Forward Electrically-Variable Mode of Operation

To establish the first forward electrically-variable mode, the torque-transmitting mechanisms 650 and 654 are engaged, the engine 12 is accelerated from the idle speed, the speed of the motor/generator 680 (operating as a generator) is decreased, and the speed of the motor/generator 682 (operating as a motor) is increased. This operation will continue until the speed of motor/generator 680 is zero, establishing a first mechanical point. This is the end of the first forward electrically-variable mode of operation. This first electrically-variable mode of operation is an input-split type of power transmission. Referring to FIG. 11, the interconnections established in the transmission 614 during the first forward electrically-variable mode, via engagement of torque-transmitting mechanisms 650 and 654 are illustrated. Specifically, nodes Q and R are both grounded to stationary member 684. The torque required at node M provided by motor/generator 680 relative to the torque provided at the input member 616 is represented by distance between nodes J and M (L7) relative to the distance between nodes J and K (L4), which denote the leverage of the motor/generator 680 and input member 616 about node J, respectively, (which is the output member of the lever 620). The length of L7 is twice the length of L4, so the torque required from the motor/generator 680 connected to node M is half the length of the torque provided to the input member 16, which is connected to node K.

At the first mechanical point, with the speed of motor/generator 680 at zero, and the node Q is stationary as held by the torque-transmitting mechanism 654. At this point, the torque-transmitting mechanisms 654 and 656 can be interchanged in a synchronous condition, such that there is no slippage involved in either the engagement or disengagement of these devices. It should also be noted that at this point, with the transmission 614 is operating in a substantially mechanical power flow arrangement, the shaft power being transmitted by the motor/generators 680, 682 is negligible, and the electrical losses from either motor/generator 680 or 682 are small. The first mechanical point is the end of the first electrically-variable mode and the beginning of the second electrically-variable mode.

Second Forward Electrically-Variable Mode of Operation

At the first mechanical point of operation, the transmission 614 may be controlled to shift from the first electrically-variable mode to a second electrically-variable mode, by disengaging torque-transmitting mechanism 654 and engaging torque-transmitting mechanism 656, with the operation of the motor/generator 682 thereby being changed from operating as a motor to operating as a generator. Also at this interchange point, the operation of motor/generator 680 changes from a generator mode to a motor mode. The speed of the engine 12 can be held at a desired speed throughout the second electrically-variable mode, or it can be varied as desired. To have the advantage of synchronous shifting from one mode to another, it is preferred that the ratio of the speed of the input member 616 to the speed of the output member 618 remains between that of the first mechanical point and that of the second mechanical point while the transmission 614 is operating in the second electrically-variable mode.

Figure 12:
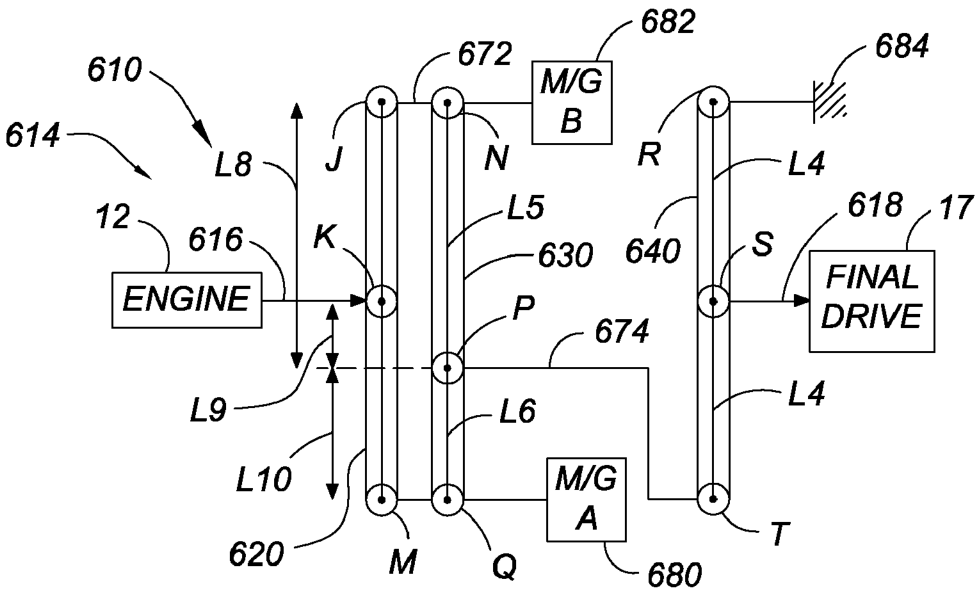
FIG. 12 is a schematic illustration of the embodiment of FIG. 10 in a second forward electrically-variable mode.

Referring to FIG. 12, the lever diagram resulting from the interconnections established in the transmission 614 during the second forward electrically-variable mode, via engagement of torque-transmitting mechanisms 650 and 656 is illustrated. Specifically, node R is grounded to stationary member 684, and motor/generator 680 and node M are connected for common rotation with node Q. The levers 620 and 630 are collapsed together, with the connected nodes J and N, and M and Q aligned, respectively. The torque required at node Q provided by motor/generator 680 is half the torque provided at the input member 616 by engine 12 when motor/generator 682 is not providing torque, as represented by the distance between nodes Q and P (L10 or L6) relative to the distance between nodes K and P (L9). The torque required at node N by motor/generator 682 is one quarter that provided at the input member 616 when motor/generator 680 is not providing torque, as represented by distance between nodes P and N (L5 or L8) relative to the distance between nodes K and P (L7).

At the first mechanical point, which is in this embodiment the beginning the second electrically-variable mode, the motor/generator 680 can provide all of the torque necessary to react the torque provided to the input member 616 without using or supplying mechanical power, because motor/generator 680 is stationary. At a second mechanical point, which is in this description the end of the second electrically-variable mode, the motor/generator 682 can supply all of the torque necessary to react the torque provided to the input member 16 without using or supplying mechanical power, because motor/generator 682 is stationary. Between these two points, the motor/generators 680 and 682 share the task of providing reaction torque, such that this load can be transferred gradually from motor/generator 680 to motor/generator 682 through the second electrically-variable mode. In the absence of battery power and electrical accessory loads, this load is transferred so that electrical power generated by motor/generator 682 is consumed by motor/generator 680, so the net effect is simply to transmit power from the input member 616 to the output member 618.

To continue to accelerate the output member 618 (and a vehicle on which the transmission 14 is installed) during the second electrically-variable mode of operation, which is a compound-split mode, the speed of the motor/generator 680 (operating as a motor) is increased from zero in the forward direction and the speed of the motor/generator 682 (operating as a generator) is decreased. Both the motor/generator 680 and the engine 12 impart positive or forward rotation to the node M, and the motor/generator 682 provides a rotating reaction member at node N of the lever 630. The electrical energy generated by the motor/generator 682 can be utilized to either recharge a battery connected to the motor/generators 680, 682, provide electrical power to drive the motor/generator 680, or to do both depending upon the amount of power needed at the motor/generator 680 and the level of charge of the battery.

The powertrain 610 continues to operate in the second electrically-variable mode until the speed of the motor/generator 682 has decreased to zero and the speed of the motor/generator 680 has increased to a maximum value. At this point, the motor/generator 682 has a zero speed, which is equal to the speed of the node R as held stationary by the torque-transmitting mechanism 650. Therefore, at this interchange point, the torque-transmitting mechanisms 650 and 652 can be interchanged in a synchronous manner, wherein no slippage occurs during the ratio interchange. This is a second mechanical point, which is the end of the second forward electrically-variable mode of operation and the beginning of the third forward electrically-variable mode of operation.

Third Forward Electrically-Variable Mode of Operation

The third forward electrically-variable mode of operation is also a compound-split mode of operation. During the third forward electrically-variable mode of operation, the motor/generator 680 is operated as a generator and the motor/generator 682 is operated as a motor. The speed of motor/generator 680 decreases while the speed of the motor/generator 682 increases. Nodes R and T are both driven in a forward or positive direction. Node R is driven by the motor/generator 682, and node T is driven by both the engine 12 through the planetary gear sets represented by levers 620 and 630, and by the motor/generator 682 through the planetary gear set represented by lever 630.

Figure 13:
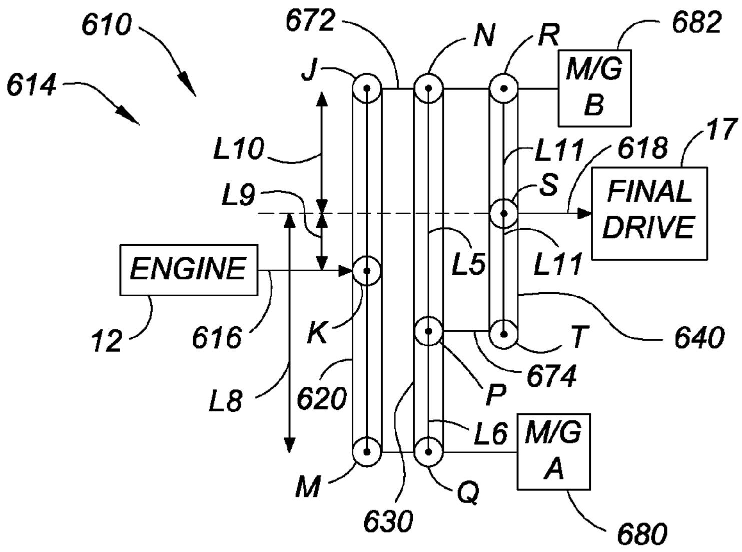
FIG. 13 is a schematic illustration of the embodiment of FIG. 10 in a third forward electrically-variable mode.
Figure 14:
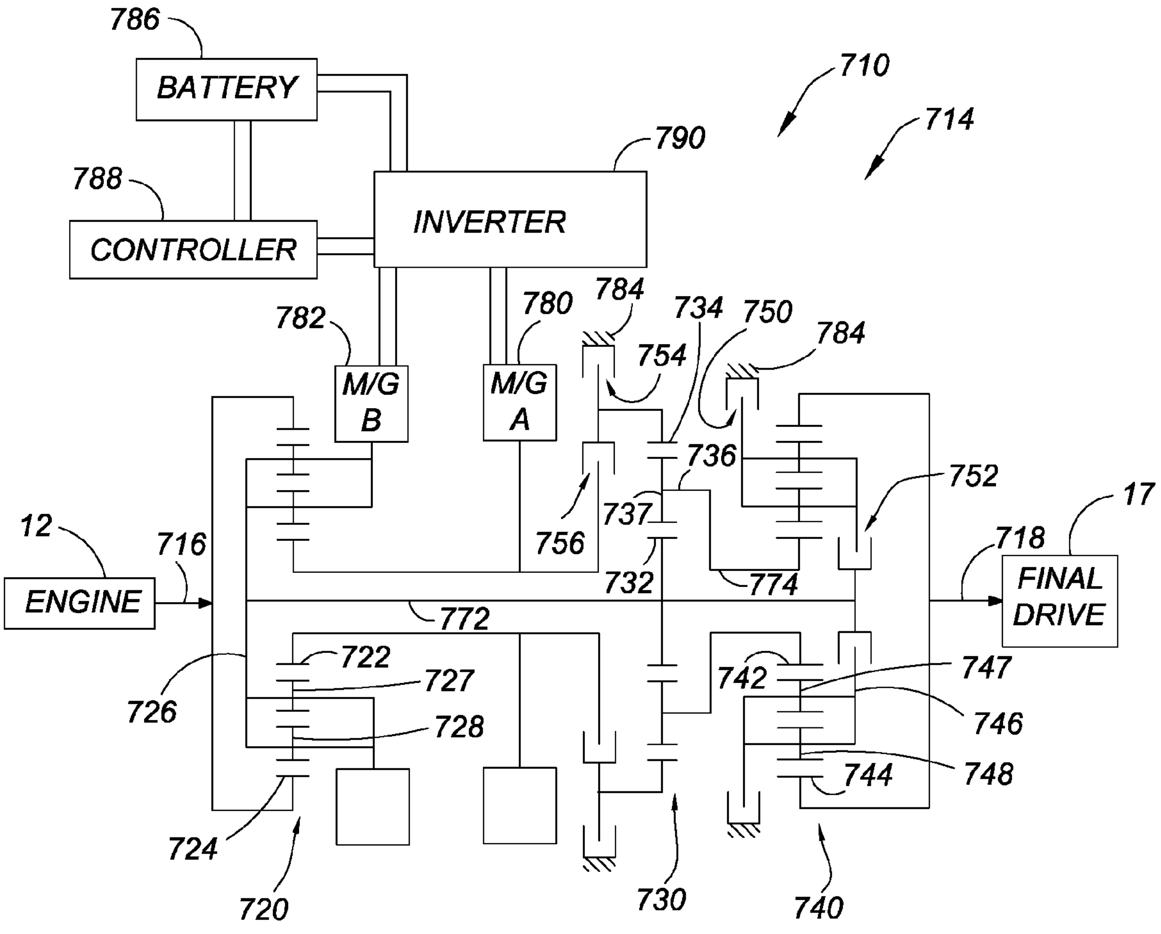
FIG. 14 is a schematic illustration of an embodiment of the transmission of FIG. 10 in stick-diagram form.

Referring to FIG. 13, the lever diagram resulting from the interconnections established in the transmission 14 during the third forward electrically-variable mode, via engagement of torque-transmitting mechanisms 652 and 656 is illustrated. Specifically, motor/generator 682 and node N are connected for common rotation with node R, and motor/generator 680 and node M are connected for common rotation with node Q. Because two nodes of lever 620 are connected with two nodes of lever 630 and two nodes of lever 630 are connected with two nodes of lever 640, the levers 20, 30 and 40 are collapsed together, with the connected nodes aligned, with the levers resealed as necessary in order to align the connected nodes. Thus, in the third electrically-variable mode, nodes J, N and R are connected, nodes M and Q are connected, as well as nodes P and T, and the levers 620, 630 and 640 are collapsed with these respective nodes aligned. The distance between nodes R and S, and the distance between the nodes S and T changes from L4 to L11 in each instance, with L11 being half the length of L4. The torque required at node Q provided by motor/generator 680 is one-quarter the torque provided at the input member 616 by engine 12 when motor/generator 682 is not providing torque, as represented by the distance between nodes Q and S (L8) relative to the distance between nodes K and S (L9). The torque required at node R by motor/generator 682 is one half that provided at the input member 616 when motor/generator 680 is not providing torque, as represented by the relative distances between nodes R and S (L11) and that between nodes K and S (L9).

Thus, the maximum torque required by motor/generator 680 to react a given torque provided by the input member 16 during the first, second and third electrically-variable modes occurs during the first forward electrically-variable mode of operation, and is identical to the maximum torque required of the motor/generator 682, which occurs during the second and third electrically-variable modes of operation. This equality in maximum torque is due to the selected gear ratios of the planetary gear sets represented by levers 620, 630 and 640, which are 1.0, 2.0 and 1.0, respectively. Because the motor/generators have the same maximum torque requirement, they may be equal in size.

During the third forward electrically-variable mode of operation, the motor/generator 680 supplies electrical power to the transmission 614 which can be utilized to power the motor/generator 682 as a motor and/or provide energy to a battery connected thereto to increase the battery storage charge. The third forward electrically-variable mode of operation can continue until the vehicle reaches a maximum speed point at which the speed of motor/generator 680 is zero, i.e., a third mechanical point.

Fixed Ratio Modes

The transmission 614 also provides three fixed ratio modes of operation. A first fixed ratio mode is provided by engaging torque-transmitting mechanisms 650, 654 and 656, preferably at the first mechanical point established between the first and second forward electrically-variable modes, when the speed of motor/generator 680 is zero. A second fixed ratio mode is established by engaging torque-transmitting mechanisms 650, 652 and 656, preferably at the second mechanical point established between the second and third electrically-variable modes, when the speed of motor/generator 682 is zero. A third fixed ratio mode is established by engaging torque-transmitting mechanisms 652, 654 and 656, preferably at the third mechanical point when the speed of motor/generator 680 is zero.

The ratio spread of the second forward electrically-variable mode of operation is identical to the ratio spread of the third electrically-variable mode of operation. The speed ratio in the second electrically-variable mode ranges from 3.0 to 1.5, establishing a ratio spread of 2.0. The speed ratio of the third electrically-variable mode ranges from 1.5 to 0.75, which is also a ratio spread of 2.0.

In FIGS. 10-13, the relative speeds of the members of each planetary gear set can be calculated using the distances between the nodes which represent those members on the lever. For the first fixed ratio mode, referring to FIG. 10, motor/generator 680, which is connected to node M is stationary, so the ratio between the speed of the input member 618, which is connected to node K, and the interconnecting member 672, which is connected to node J, is the distance between node K to node M, L4, to the distance between node J to node M, L7, which is twice L4, resulting in the ratio one half for a planetary gear set with an effective gear ratio of 1.0. The ratio between the interconnecting member 672 which is connected to node N and the interconnecting member 674 which is connected to node P is the distance from node N to node Q, L5 plus L6 (i.e., L7), to the distance from node P to node Q, L6, resulting in the ratio of three to one for a planetary gear set with an effective gear ratio of 2.0. The ratio between the interconnecting member 674 and the output member 618 may be found in the same way, using lever 640 and the ratios of the distances from node T to node R to the distance from node S to node R, with the result of two to one for lever 640 representing a planetary gear set with an effective gear ratio of 1.0. The overall speed ratio for the first fixed ratio mode is then the product of these three ratios, a speed ratio of 3.0.

For the second fixed ratio mode, referring to FIG. 12, motor/generator 682 is stationary, so the speed ratio between the input member 616, which is connected to node K and the interconnecting member 674, which is connected to node P, is the ratio of the distance from node K to nodes J and N (L8 less L9, or one to two)) to the distance from node P to nodes J and N (L9, or two-thirds), resulting in a ratio of three to four for planetary gear sets with effective gear ratios of 1.0 and 2.0, represented by levers 620 and 630, respectively. The speed ratio between the interconnecting member 674 and the output member 618 may be found in the same way, using lever 640 and the ratios of the distances from node T to node R to the distance from node S to node R, with the result of two to one for lever 640 representing a planetary gear set with an effective gear ratio of 1.0. The overall speed ratio for the first fixed ratio mode is then the product of these two speed ratios, giving a speed ratio of 1.5.

For the third fixed speed ratio mode, referring to FIG. 13, motor/generator 680 is stationary, so the overall speed ratio through the transmission 614 is the ratio of the distance from node K, to which the input member 616 is connected for common rotation, to nodes M and Q, which is L8 less L9 or L4, to the distance from node S, to which the output member 618 is connected for common rotation, to nodes M and Q, which is L8 (i.e., L4 plus L9). Thus the third fixed ratio mode has a speed ratio of 4 to 3 which is 0.75.

Sixth Specific Embodiment

A powertrain 710, shown in FIG. 14, provides a specific embodiment of a transmission 714 representable by and operable in the same manner as the powertrain 610 shown in lever diagram form in FIGS. 10-13. Powertrain 710 includes the engine 12, the final drive mechanism 17, and an electrically-variable transmission 714 with an input member 716 connected for rotation with the engine 12 and an output member 718 connected for rotation with the final drive mechanism 17. The transmission 714 includes three planetary gear sets 720, 730, and 740, represented in FIGS. 11-13 as levers 620, 630 and 640, respectively.

The planetary gear set 720 includes a sun gear member 722, a ring gear member 724, and a carrier member 726. The carrier member 726 rotatably supports a first set of pinion gears 727 and a second set of pinion gears 728. The first set of pinion gears 727 is disposed in meshing relationship with both the sun gear member 722 and the second set of pinion gears 728. The second set of pinion gears 728 are disposed in meshing relationship with the first set of pinion gears 727 and the ring gear member 724. Thus, the planetary gear set 720 is a compound, S-P-P-R gear set. The ring gear member 724 has 104 teeth and the sun gear member 722 has 52 teeth, establishing an effective gear ratio of 1.00 for the planetary gear set 720.

The planetary gear set 730 includes a sun gear member 732, a ring gear member 734, and a carrier member 736 that rotatably supports a plurality of pinion gears 737 that are disposed in meshing relationship with both the sun gear member 732 and the ring gear member 734. The ring gear member 734 has 88 teeth and the sun gear member 732 has 44 teeth, establishing an effective gear ratio of 2.0 for the planetary gear set 730.

The planetary gear set 740 includes a sun gear member 742, a ring gear member 744, and a carrier member 746. The carrier member 746 rotatably supports a first set of pinion gears 747 as well as a second set of pinion gears 748. The first set of pinion gears 747 is disposed in meshing relationship with both the sun gear member 742 and the second set of pinion gears 748. The second set of pinion gears 748 is disposed in meshing relationship with the first set of pinion gears 747 and with the ring gear member 744. Thus, the planetary gear set 740 is a compound, S-P-P-R gear set. In the S-P-P-R gear set 740, the speed of the ring gear member 744 is the weighted average of the speeds of the sun gear member 742 and the carrier member 746. The torque into the sun gear member 742 and the torque into the carrier member 746 sum to the torque out of the ring gear member 744. The ring gear member 744 has 104 teeth and the sun gear member 742 has 52 teeth. The effective gear ratio of the planetary gear set 740 is 1.0.

An interconnecting member 772 continuously connects the carrier member 726 and the sun gear member 732. An interconnecting member 774 continuously connects the carrier member 736 with sun gear member 742.

The ring gear member 724, carrier member 726 and sun gear member 722 correspond with nodes K, J and M, respectively, of FIGS. 10-13. The ring gear member 734, carrier member 736 and sun gear member 732 correspond with nodes Q, P and N, respectively. The carrier member 746, the ring gear member 744, and the sun gear member 742 correspond with nodes R, S and T, respectively.

The electrically-variable transmission 714 also includes two motor/generators 780 and 782 that may receive electrical power from or provide electrical power to an energy storage device 786 such as a battery. An electronic controller 788 is in signal communication with the battery 786 and with a power inverter 790 that is also in electrical communication with the stator portions of the motor/generators 780, 782. The controller 788 responds to a variety of input signals including vehicle speed, operator demand, the level at which the battery 786 is charged and the power being provided by the engine 12 to regulate the flow of power between the motor/generators 780, 782 and the battery 786 via the inverter 790, which converts between direct current provided or utilized by the battery 786 and alternating current provided or utilized by the stator portions of the motor/generators 780, 782.

The electrically-variable transmission 714 also includes a plurality of torque-transmitting mechanisms 750, 752, 754 and 756. Torque-transmitting mechanism 750 is selectively engagable to ground the carrier member 746 to a stationary member 784. Torque-transmitting mechanism 752 is selectively engagable to connect sun gear member 732, the carrier member 726 and motor/generator 782 for common rotation with carrier member 746. Torque-transmitting mechanism 754 is selectively engagable to ground the ring gear member 734 to the stationary member 784. Torque-transmitting mechanism 756 is selectively engagable to connect the motor/generator 780 and the sun gear member 722 for common rotation with the ring gear member 734.

The operation of the powertrain 710 is the same as the operation of the powertrain 610, depicted in FIGS. 10-13. That is, engagement of torque-transmitting mechanisms 750 and 754 establish a first forward electrically-variable mode, engagement of torque-transmitting mechanisms 750 and 756 establish a second forward electrically-variable mode, and engagement of torque-transmitting mechanisms 752 and 756 establish a third forward electrically-variable mode. The transmission 714 also provides three fixed ratio modes of operation. A first fixed ratio mode is provided by engaging torque-transmitting mechanisms 750, 754 and 756 (providing a fixed speed ratio of 3.0), preferably at the first mechanical point established between the first and second forward electrically-variable modes. A second fixed ratio mode is established by engaging torque-transmitting mechanisms 750, 752 and 756 (providing a fixed ratio of 1.5), preferably at the second mechanical point established between the second and third electrically-variable modes. A third fixed ratio mode is established by engaging torque-transmitting mechanisms 752, 754 and 756 (providing a fixed ratio of 0.75), preferably at the third mechanical point when the speed of motor/generator 780 is zero.

Moreover, the maximum torque required from motor/generator 780 is the same as that required from motor/generator 782, allowing them to be of identical size, as described with respect to the representative lever diagrams of FIGS. 10-13.

A method of designing a transmission will be described with respect to the embodiment of FIG. 5; however it should be appreciated that the method applies to all embodiments described herein. The method includes selecting continuous connections between the motor/generators and selected members of the planetary gear sets and selective connections between different members of the planetary gear sets or between a member of a planetary gear set and a stationary member. Referring to FIG. 5, a continuous connections selected in the transmission 110 are the main shaft or interconnecting member 170 which continuously connects the carrier member 126, the carrier member 136, and the sun gear member 142. The selective connections are via engagement of torque-transmitting mechanisms. Referring, to FIG. 5, the selective connections are the connections of the carrier member 146 to the stationary member 184 by engagement of torque-transmitting mechanism 150. The selective connections include the connection of the sun gear member 132 and the motor/generator 182 to the carrier member 146 by selective engagement of torque-transmitting mechanism 152. The selective connections further include the connection of ring gear member 134 to the stationary member 184 by engagement of torque-transmitting mechanism 154. The selective connections also include connection of sun gear member 122 and motor/generator 180 to the ring gear member 134 by selective engagement of torque-transmitting mechanism 156. The selected continuous connections and selected connections enable three electrically-variable forward modes of operation by engagement of different combinations of the torque-transmitting mechanisms. Specifically, with respect to the powertrain 110 of FIG. 5, engagement of torque-transmitting mechanisms 150 and 154 establishes a first electrically-variable mode; engagement of torque-transmitting mechanisms 150 and 156 establishes a second electrically-variable mode; and engagement of torque-transmitting mechanisms 152 and 156 establishes a third electrically-variable mode.

The method further includes selecting effective gear ratios for the three planetary gear sets that will require a substantially equal maximum torque from each motor/generator for a given input torque during the three forward electrically-variable modes, thereby allowing the first and second motor/generators to be substantially equal in size. Referring to FIG. 5, as discussed above, the effective gear ratio for planetary gear set 120 is 2.0, the effective gear ratio for planetary gear set 130 is 2.0, and the effective gear ratio for planetary gear set 140 is 1.36. These gear ratios allow the motor/generators 180 and 182 to be substantially equal in size, as the same maximum torque is required from each during the three forward electrically-variable modes.

While the best modes for carrying out the invention have been described in detail, those familiar with the art to which this invention relates will recognize various alternative designs and embodiments for practicing the invention within the scope of the appended claims.

The invention claimed is:

1. An electrically-variable transmission comprising:

an input member and an output member;

first and second motor/generators;

a first, a second and a third planetary gear set, each having a first, a second and a third member; wherein the input member, the output member and the motor/generators are each connected for common rotation with a respective different one of the members;

a plurality of torque-transmitting mechanisms selectively engagable to connect different ones of the members for common rotation with one another or with a stationary member;

wherein engagement of different combinations of the torque-transmitting mechanisms establishes three forward electrically-variable modes of operation; and wherein the planetary gear sets are characterized by effective gear ratios that require a substantially equal maximum torque from each of the motor/generators during the three forward electrically-variable modes for a given torque on the input member, thereby allowing the first and second motor/generators to be substantially equal in size.

2. The electrically-variable transmission of claim 1, wherein said substantially equal maximum torque is required from either of the motor/generators in each of the three forward electrically-variable modes.

3. The electrically-variable transmission of claim 1, wherein the first electrically-variable mode is an input-split mode; and wherein the second and third electrically-variable modes are compound-split modes characterized by substantially identical ratio spreads.

4. The electrically-variable transmission of claim 3, wherein the effective gear ratios of two of the three planetary gear sets are not less than 1.0 and not greater than 1.4 and the effective gear ratio of the other planetary gear set is not less than 1.7 and not greater than 2.3.

5. The electrically-variable transmission of claim 3, wherein the effective gear ratios of two of the three planetary gear sets are not less than 1.7 and not greater than 2.3 and the effective gear ratio of the other planetary gear set is not less than 1.0 and not greater than 1.4.

6. The electrically-variable transmission of claim 1, further comprising:

an interconnecting member continuously connected with one of the members of the first planetary gear set;

wherein the third planetary gear set is a compound planetary gear set having one of the first, second and third members connected for common rotation with one of the stationary member and one of the motor/generators in each of the three forward electrically-variable modes and having another of the first, second and third members connected for common rotation with the interconnecting member in each of the three forward electrically-variable modes; and wherein the member connected with one of the stationary member and one of the motor generators and the member connected for common rotation with the interconnecting member determine the effective gear ratio of the third planetary gear set.

7. The electrically-variable transmission of claim 6, wherein the first, second and third members of the third planetary gear set include a first sun gear member, a carrier member rotatably supporting a first and a second set of pinion gears, and a second sun gear member; wherein the first and second sets of pinion gears continuously mesh with one another; and wherein the first sun gear member continuously meshes with the first set of pinion gears and the second sun gear member continuously meshes with the second set of pinion gears.

8. The electrically-variable transmission of claim 7, wherein the member connected for common rotation with one of the stationary member and one of the motor/generators in each of the three electrically-variable modes is the carrier member; and wherein the member connected for common rotation with the interconnecting member is the first sun gear member.

9. The electrically-variable transmission of claim 8, wherein the carrier member is connected for common rotation with the output member in each of the three forward electrically-variable modes.

10. The electrically-variable transmission of claim 8, further comprising:

a ring gear member intermeshing with one of the sets of pinion gears; and an additional torque-transmitting mechanism selectively engagable to ground the ring gear member to the stationary member, thereby at least partially establishing a reverse electrically-variable mode.

11. The electrically-variable transmission of claim 6, wherein the first, second and third members of the third planetary gear set include a sun gear member, a carrier member rotatably supporting a first and a second set of pinion gears, and a ring gear member;

wherein the first and second sets of pinion gears continuously mesh with one another; and wherein the sun gear member continuously meshes with the first set of pinion gears and the second set of pinion gears continuously meshes with the ring gear member.

12. The electrically-variable transmission of claim 11, wherein the member connected for common rotation with one of the stationary member and one of the motor/generators in each of the three forward electrically-variable modes is the carrier member; and wherein the member connected for common rotation with the interconnecting member in each of the three forward electrically-variable modes is the sun gear member.

13. The electrically-variable transmission of claim 1, wherein each of the first, second and third planetary gear sets is representable by a respective three-node lever having a first, a second and a third node representing the respective first, second and third members; wherein the first and the third planetary gear sets are compound planetary gear sets; and further comprising:

a first interconnecting member continuously connecting the second node of the first lever for common rotation with the first node of the second lever;

a second interconnecting member continuously connecting the second node of the second lever for common rotation with the second node of the third lever; wherein the input member is continuously connected for common rotation with the first node of the first planetary gear set; wherein the first node of the third planetary gear set is continuously connected for common rotation with the output member; wherein the first motor/generator is continuously connected with the third node of the first lever; wherein the second motor/generator is continuously connected with the first node of the second lever; wherein a first of the torque-transmitting mechanisms is selectively engagable to connect the third node of the third lever with the stationary member; wherein a second of the torque-transmitting mechanisms is selectively engagable to connect the third node of the third lever for common rotation with the first node of the second lever; wherein a third of the torque-transmitting mechanisms is selectively engagable to connect the third node of the second lever with the stationary member; wherein a fourth of the torque-transmitting mechanisms is selectively engagable to connect the third node of the first lever for common rotation with the third node of the second lever; wherein the first and third torque-transmitting mechanisms are engaged to establish the first electrically-variable mode; wherein the first and fourth torque-transmitting mechanisms are engaged to establish the second electrically-variable mode; and wherein the second and fourth torque-transmitting mechanisms are engaged to establish the third electrically-variable mode.

14. The electrically-variable transmission of claim 1, wherein each of the first, second and third planetary gear sets is representable by a respective three-node lever having a first, a second and a third node representing the respective first, second and third members; wherein the third planetary gear set is a compound planetary gear set; and further comprising:

an interconnecting member continuously connecting for common rotation the respective second nodes of each of the levers;

wherein the input member is continuously connected for common rotation with the first node of the first planetary gear set; wherein the first node of the third planetary gear set is continuously connected for common rotation with the output member; wherein the first motor/generator is continuously connected with the third node of the first lever; wherein the second motor/generator is continuously connected with the first node of the second lever; wherein a first of the torque-transmitting mechanisms is selectively engagable to connect the third node of the third lever with the stationary member; wherein a second of the torque-transmitting mechanisms is selectively engagable to connect the third node of the third lever for common rotation with the first node of the second lever; wherein a third of the torque-transmitting mechanisms is selectively engagable to connect the third node of the second lever with the stationary member; wherein a fourth of the torque-transmitting mechanisms is selectively engagable to connect the third node of the first lever for common rotation with the third node of the second lever; wherein the first and third torque-transmitting mechanisms are engaged to establish the first electrically-variable mode; wherein the first and fourth torque-transmitting mechanisms are engaged to establish the second electrically-variable mode; and wherein the second and fourth torque-transmitting mechanisms are engaged to establish the third electrically-variable mode.

15. The electrically-variable transmission of claim 1, wherein a first, a second, a third and a fourth of the torque-transmitting mechanisms are selectively engagable in different combinations of pairs to establish the three-forward electrically-variable modes and a plurality of fixed ratio modes; and further comprising:

an additional torque-transmitting mechanism selectively engagable to connect two of the members of one of the planetary gear sets for common rotation, thus providing additional fixed ratio modes.

16. An electrically-variable transmission comprising:

an input member and an output member;

first and second motor/generators;

a first, a second and a third planetary gear set each having a first, a second, and a third member, and each planetary gear set being representable by a different lever of a lever diagram, each lever having at least a first, a second and a third node corresponding with the first, the second, and the third member of the respective planetary gear set represented; wherein the input member, the output member, the first motor/generator and the second motor/generator are connected with different nodes; and a plurality of torque-transmitting mechanisms selectively engagable in different combinations to connect the nodes with one another or with a stationary member to establish three forward electrically-variable modes in which the levers are collapsed such that the nodes with which the motor/generators are connected are substantially equidistant from the node with which the input member is connected such that, for a given torque at the input member, a substantially equal maximum torque is required from each of the motor/generators during the three forward electrically-variable modes.

17. The electrically-variable transmission of claim 16, wherein said substantially equal maximum torque is required from either of the motor/generators in each of the three forward electrically-variable modes.

18. The electrically-variable transmission of claim 16, further comprising:

an interconnecting member continuously connected with one of the members of the first planetary gear set;

wherein the third planetary gear set is a compound planetary gear set having one of the first, second and third members connected for common rotation with one of the stationary member and one of the motor/generators in each of the three forward electrically-variable modes and having another of the first, second and third members connected for common rotation with the interconnecting member in each of the three forward electrically-variable modes; and wherein the member connected with one of the stationary member and one of the motor generators and the member connected for common rotation with the interconnecting member determine the effective gear ratio of the third planetary gear set.

19. The electrically-variable transmission of claim 16, wherein the first, second and third members of the third planetary gear set include a first sun gear member, a carrier member rotatably supporting a first and a second set of pinion gears, and a second sun gear member; wherein the first and second sets of pinion gears continuously mesh with one another; and wherein the first sun gear member continuously meshes with the first set of pinion gears and the second sun gear member continuously meshes with the second set of pinion gears.

20. The electrically-variable transmission of claim 16, wherein the first, second and third members of the third planetary gear set include a sun gear member, a carrier member rotatably supporting a first and a second set of pinion gears, and a ring gear member;

wherein the first and second sets of pinion gears continuously mesh with one another; and wherein the sun gear member continuously meshes with the first set of pinion gears and the second set of pinion gears continuously meshes with the ring gear member.

21. The electrically-variable transmission of claim 16, wherein each of the different levers representing the first, second and third planetary gear sets is a three-node lever; wherein the first and the third planetary gear sets are compound planetary gear sets; and further comprising:

a first interconnecting member continuously connecting the second node of the first lever for common rotation with the first node of the second lever;

a second interconnecting member continuously connecting the second node of the second lever for common rotation with the second node of the third lever; wherein the input member is continuously connected for common rotation with the first node of the first planetary gear set; wherein the first node of the third planetary gear set is continuously connected for common rotation with the output member; wherein the first motor/generator is continuously connected with the third node of the first lever; wherein the second motor/generator is continuously connected with the first node of the second lever; wherein a first of the torque-transmitting mechanisms is selectively engagable to connect the third node of the third lever to the stationary member; wherein a second of the torque-transmitting mechanisms is selectively engagable to connect the third node of the third lever for common rotation with the first node of the second lever;

wherein a third of the torque-transmitting mechanisms is selectively engagable to connect the third node of the second lever with the stationary member; wherein a fourth of the torque-transmitting mechanisms is selectively engagable to connect the third node of the first lever for common rotation with the third node of the second lever; wherein the first and third torque-transmitting mechanisms are engaged to establish the first electrically-variable mode; wherein the first and fourth torque-transmitting mechanisms are engaged to establish the second electrically-variable mode; and wherein the second and fourth torque-transmitting mechanisms are engaged to establish the third electrically-variable mode.

22. The electrically-variable transmission of claim 16, wherein the first electrically-variable mode is an input-split mode; and wherein the second and third electrically-variable modes are compound-split modes characterized by substantially identical ratio spreads.

23. An electrically-variable transmission comprising:

an input member and an output member;

two electric motor/generators;

a plurality of planetary gear sets, each having a plurality of members; wherein at least two pairs of the members are continuously connected for common rotation, each of the pairs including members of two of the planetary gear sets;

a plurality of selectively engagable torque-transmitting mechanisms;

wherein the plurality of members of at least one of the planetary gear sets include a first gear member, a second gear member, and a carrier member that rotatable supports a first and a second set of pinion gears; wherein the first set of pinion gears meshes with the first gear; wherein the second set of pinion gears meshes with the first set of pinion gears and with the second gear;

wherein the torque-transmitting mechanisms are selectively engagable in at least two combinations of three to thereby effect two different fixed speed ratios between the input member and the output member; wherein the torque-transmitting mechanisms are selectively engagable in at least three combinations of two to thereby effect, in conjunction with the electric motor/generators, variable speed ratio modes between the input member and the output member; and wherein the maximum torque ratio between the input member and the first motor/generator during the variable speed ratio modes is substantially equal to the maximum torque ratio between the input member and the second motor/generator during the variable speed ratio modes.

24. A method of designing a transmission having three planetary gear sets and two motor/generators comprising:

selecting continuous connections between the motor/generators and selected ones of the planetary gear sets and selective connections, via engagement of torque-transmitting mechanisms, between different members of the planetary gear sets or between a member of the planetary gear sets and a stationary member to enable three forward electrically-variable modes of operation by engagement of different combinations of the torque-transmitting mechanisms; and selecting effective gear ratios for the three planetary gear sets that require a substantially equal maximum torque from each motor/generator for a given input torque over the three electrically-variable modes, thereby allowing the first and second motor/generators to be substantially equal in size.

25. An electrically-variable transmission comprising:

an input member and an output member;

first and second motor/generators;

a first, a second and a third planetary gear set each having a first, a second, and a third member, and each planetary gear set being representable by a different three-node lever of a lever diagram, each lever having a first, a second and a third node corresponding with the first, the second, and the third member of the respective planetary gear set represented; wherein the first and the third planetary gear sets are compound planetary gear sets; wherein the input member, the output member, the first motor/generator and the second motor/generator are connected with different ones of the nodes;

a plurality of torque-transmitting mechanisms selectively engagable in different combinations to connect the nodes with one another or with a stationary member to establish three forward electrically-variable modes;

a first interconnecting member continuously connecting the second node of the first lever for common rotation with the first node of the second lever;

a second interconnecting member continuously connecting the second node of the second lever for common rotation with the second node of the third lever; wherein the input member is continuously connected for common rotation with the first node of the first planetary gear set; wherein the first node of the third planetary gear set is continuously connected for common rotation with the output member; wherein the first motor/generator is continuously connected with the third node of the first lever; and wherein the second motor/generator is continuously connected with the first node of the second lever.

26. The electrically-variable transmission of claim 25, wherein a first of the torque-transmitting mechanisms is selectively engagable to connect the third node of the third lever to the stationary member; wherein a second of the torque-transmitting mechanisms is selectively engagable to connect the third node of the third lever for common rotation with the first node of the second lever; wherein a third of the torque-transmitting mechanisms is selectively engagable to connect the third node of the second lever with the stationary member; wherein a fourth of the torque-transmitting mechanisms is selectively engagable to connect the third node of the first lever for common rotation with the third node of the second lever; wherein the first and third torque-transmitting mechanisms are engaged to establish the first electrically-variable mode; wherein the first and fourth torque-transmitting mechanisms are engaged to establish the second electrically-variable mode; and wherein the second and fourth torque-transmitting mechanisms are engaged to establish the third electrically-variable mode.

27. The electrically-variable transmission of claim 26, further comprising:

an additional torque-transmitting mechanism selectively engagable to connect two of the members of one of the planetary gear sets for common rotation, thus providing additional fixed ratio modes.

* * * * *